United States Patent
Schuster et al.

(10) Patent No.: US 12,480,958 B2
(45) Date of Patent: Nov. 25, 2025

(54) METHOD FOR THE CHARACTERIZATION OF PEPTIDE:MHC BINDING POLYPEPTIDES

(71) Applicant: Immatics Biotechnologies GmbH, Tuebingen (DE)

(72) Inventors: Heiko Schuster, Tuebingen (DE); Meike Hutt, Tuebingen (DE); Toni Weinschenk, Tuebingen (DE); Sebastian Bunk, Tuebingen (DE); Oliver Schoor, Tuebingen (DE); Linus Backert, Tuebingen (DE); Martin Hofmann, Tuebingen (DE); Jens Fritsche, Tuebingen (DE); Felix Unverdorben, Tuebingen (DE); Gisela Schimmack, Tuebingen (DE); Florian Salopiata, Tuebingen (DE)

(73) Assignee: Immatics Biotechnologies GmbH, Tübingen (DE)

(*) Notice: Subject to any disclaimer, the term of this patent is extended or adjusted under 35 U.S.C. 154(b) by 1188 days.

(21) Appl. No.: 16/990,701

(22) Filed: Aug. 11, 2020

(65) Prior Publication Data

US 2021/0048442 A1  Feb. 18, 2021

Related U.S. Application Data

(60) Provisional application No. 62/886,225, filed on Aug. 13, 2019.

(30) Foreign Application Priority Data

Aug. 13, 2019 (DE) ............... 10 2019 121 834.9

(51) Int. Cl.
G01N 33/68 (2006.01)
C07K 14/74 (2006.01)

(52) U.S. Cl.
CPC .......... *G01N 33/6878* (2013.01); *G01N 2333/70539* (2013.01); *G01N 2570/00* (2013.01)

(58) Field of Classification Search
None
See application file for complete search history.

(56) References Cited

U.S. PATENT DOCUMENTS

| | | | |
|---|---|---|---|
| 7,329,731 B2 | 2/2008 | Jakobsen et al. | |
| 7,569,357 B2 | 8/2009 | Kranz et al. | |
| 7,763,718 B2 | 7/2010 | Jakobsen et al. | |
| 9,637,548 B2 | 5/2017 | Sahin et al. | |
| 9,791,443 B2 | 10/2017 | Weinschenk et al. | |
| 10,081,663 B2 | 9/2018 | Eisenbach et al. | |
| 10,319,575 B2 | 6/2019 | Brown et al. | |
| 2002/0119149 A1 | 8/2002 | Jakobsen et al. | |
| 2004/0253632 A1 | 12/2004 | Rhode et al. | |
| 2005/0287611 A1 | 12/2005 | Nugent et al. | |
| 2007/0154953 A1 | 7/2007 | Brunner et al. | |
| 2018/0125889 A1 | 5/2018 | Leek et al. | |
| 2019/0227063 A1 | 7/2019 | Scheinberg et al. | |
| 2019/0324030 A1 | 10/2019 | Tareen et al. | |
| 2020/0088726 A1 | 3/2020 | Moritz et al. | |
| 2020/0309765 A1 | 10/2020 | Bethune et al. | |

FOREIGN PATENT DOCUMENTS

| | | |
|---|---|---|
| CN | 109072219 A | 12/2018 |
| JP | 2007519910 A | 7/2007 |
| JP | 2008500527 A | 1/2008 |
| JP | 2015521172 A | 7/2015 |
| JP | 2017534280 A | 11/2017 |
| JP | 2019516357 A | 6/2019 |
| JP | 2020511964 A | 4/2020 |
| JP | 2021536578 A | 12/2021 |
| WO | 2001048145 A2 | 7/2001 |
| WO | 2014191432 A1 | 12/2014 |
| WO | 2016010002 A1 | 1/2016 |
| WO | WO2016/107740 A1 * | 7/2016 |
| WO | 2017089779 A1 | 6/2017 |
| WO | 2017115798 A1 | 7/2017 |
| WO | 2018053374 A2 | 3/2018 |
| WO | 2020053398 A2 | 3/2020 |

OTHER PUBLICATIONS

Bijen et al (Molecular Ther. 2018, 26(5): 1206-214 plus suppl. figs.) (Year: 2018).*
Freudenmann et al (Immunol., 2018, 154: 331-345) (Year: 2018).*
HLA Nomenclature, 2023, 2 pages (Year: 2023).*
Poosarla et al (Biotechn. Bioeng., 2017, 114(6): 1331-1342) (Year: 2017).*
Cohen et al (J. Molec. Recognition, 2003, 16: 324-332) (Year: 2003).*
Oates et al (Molec. Immunol., 2015, 67: 67-74) (Year: 2015).*
Hassan et al (J. Proteomics, 2014, 109: 240-244 plus suppl material) (Year: 2014).*
Singh et al (J. Immunol. 2017, 199: 2203-2213) (Year: 2017).*
Ekeruche-Makinde, Julia, et al. "Peptide length determines the outcome of TCR/peptide-MHCI engagement" Blood, vol. 121, No. 7, pp. 1112-1123, Feb. 2013.
International Search Report and Written Opinion issued Jan. 18, 2021 in International Application No. PCT/EP2020/072674 (12 pages).
Van Den Berg, Joost H., et al. "Case Report of a Fatal Serious Adverse Event Upon Administration of T Cells Transduced With a MART-1-specific T-cell Receptor" Molecular Therapy, vol. 23, No. 9, pp. 1541-1550, Sep. 2015.

(Continued)

*Primary Examiner* — Misook Yu
*Assistant Examiner* — Marianne Dibrino
(74) *Attorney, Agent, or Firm* — McBee, Moore & Vanik IP, LLC

(57) ABSTRACT

The present invention relates to a method for the characterization of peptide:MHC binding polypeptides, e.g. by mass spectrometry and an analysis of the recognized peptide space, i.e. in order to identify peptides that can be bound in the context of their presentation by MHC, and those who cannot be bound.

22 Claims, 11 Drawing Sheets

Specification includes a Sequence Listing.

(56) References Cited

OTHER PUBLICATIONS

Specification, claims, Abstract and drawings of U.S. Application No. 62/858, 167, filed Jun. 6, 2019, Only originally filed spec, abstract and drawings considered.

Karapetyan, et al., "TCR Fingerprinting and Off-Target Peptide Identification," Front Immunol . Oct. 22, 2019:10:2501.

Tsuruta, et al., "Bladder cancer-associated cancer-testis antigen-derived long peptides encompassing both CTL and promiscuous HLA class II-restricted Th cell epitopes induced CD4+ T cells expressing converged T-cell receptor genes in vitro," Oncoimmunology . Jan. 5, 2018;7(4):e1415687, 15 pages.

Moritz, et al., "High-throughput peptide-MHC complex generation and kinetic screenings of TCRs with peptide-receptive HLA-A*02:01 molecules," Sci Immunol . Jul. 19, 2019;4(37):eaav0860—Abstract provided, Abstract only, 2 pages.

Loftus, et al., "Highly cross-reactive T cell responses to myelin basic protein epitopes reveal a nonpredictable form of TCR degeneracy," J Immunol . Jun. 1, 1999;162(11):6451-7—Abstract Provided, abstract only.

Gee, et al., "Antigen Identification for Orphan T Cell Receptors Expressed on Tumor-Infiltrating Lymphocytes," Cell . Jan. 25, 2018;172(3):549-563.e16.

Tissot, et al., "Characterizing the functionality of recombinant T-cell receptors in vitro: a pMHC tetramer based approach," J Immunol Methods . Mar. 6, 2000;236(1-2):147-65—Abstract and Introduction Provided.

\* cited by examiner

SEQUENCE LISTING

```
<160> NUMBER OF SEQ ID NOS: 204

<210> SEQ ID NO 1
<211> LENGTH: 9
<212> TYPE: PRT
<213> ORGANISM: Homo sapiens

<400> SEQUENCE: 1

Ser Leu Leu Gln His Leu Ile Gly Leu
1               5

<210> SEQ ID NO 2
<211> LENGTH: 9
<212> TYPE: PRT
<213> ORGANISM: Homo sapiens

<400> SEQUENCE: 2

Phe Met Asn Pro His Leu Ile Ser Val
1               5
```

```
<210> SEQ ID NO 3
<211> LENGTH: 9
<212> TYPE: PRT
<213> ORGANISM: Homo sapiens

<400> SEQUENCE: 3

Met Leu Ala Lys His Val Ile Thr Leu
1               5

<210> SEQ ID NO 4
<211> LENGTH: 9
<212> TYPE: PRT
<213> ORGANISM: Homo sapiens

<400> SEQUENCE: 4

Val Leu Leu His His Gln Ile Gly Leu
1               5

<210> SEQ ID NO 5
<211> LENGTH: 9
<212> TYPE: PRT
<213> ORGANISM: Homo sapiens

<400> SEQUENCE: 5

Leu Leu Leu Ala His Ile Ile Ala Leu
1               5

<210> SEQ ID NO 6
<211> LENGTH: 9
<212> TYPE: PRT
<213> ORGANISM: Homo sapiens

<400> SEQUENCE: 6

Ala Leu Met Tyr His Thr Ile Thr Leu
1               5

<210> SEQ ID NO 7
<211> LENGTH: 9
<212> TYPE: PRT
<213> ORGANISM: Homo sapiens

<400> SEQUENCE: 7

Ile Leu Ala Met His Leu Ile Asp Val
1               5

<210> SEQ ID NO 8
<211> LENGTH: 9
<212> TYPE: PRT
<213> ORGANISM: Homo sapiens

<400> SEQUENCE: 8

Phe Leu Pro Ile His Leu Leu Gly Leu
1               5

<210> SEQ ID NO 9
<211> LENGTH: 9
<212> TYPE: PRT
<213> ORGANISM: Homo sapiens

<400> SEQUENCE: 9

Tyr Leu Ile Leu His Leu Ile Ser Thr
1               5

<210> SEQ ID NO 10
```

```
<211> LENGTH: 9
<212> TYPE: PRT
<213> ORGANISM: Homo sapiens

<400> SEQUENCE: 10

Ala Leu Ala Lys His Leu Ile Lys Ile
1               5

<210> SEQ ID NO 11
<211> LENGTH: 9
<212> TYPE: PRT
<213> ORGANISM: Homo sapiens

<400> SEQUENCE: 11

Thr Leu Val Tyr His Val Val Gly Val
1               5

<210> SEQ ID NO 12
<211> LENGTH: 9
<212> TYPE: PRT
<213> ORGANISM: Homo sapiens

<400> SEQUENCE: 12

Ala Leu Ala Asn His Leu Ile Lys Val
1               5

<210> SEQ ID NO 13
<211> LENGTH: 9
<212> TYPE: PRT
<213> ORGANISM: Homo sapiens

<400> SEQUENCE: 13

Leu Thr Leu Gly His Leu Met Gly Val
1               5

<210> SEQ ID NO 14
<211> LENGTH: 9
<212> TYPE: PRT
<213> ORGANISM: Homo sapiens

<400> SEQUENCE: 14

Ile Leu Gly Thr His Asn Ile Thr Val
1               5

<210> SEQ ID NO 15
<211> LENGTH: 9
<212> TYPE: PRT
<213> ORGANISM: Homo sapiens

<400> SEQUENCE: 15

Lys Leu Thr Ser His Ala Ile Thr Leu
1               5

<210> SEQ ID NO 16
<211> LENGTH: 9
<212> TYPE: PRT
<213> ORGANISM: Homo sapiens

<400> SEQUENCE: 16

His Leu Met Pro His Leu Leu Thr Leu
1               5

<210> SEQ ID NO 17
<211> LENGTH: 9
<212> TYPE: PRT
```

```
<213> ORGANISM: Homo sapiens

<400> SEQUENCE: 17

Ala Ile Trp Glu Lys Leu Ile Ser Leu
1               5

<210> SEQ ID NO 18
<211> LENGTH: 9
<212> TYPE: PRT
<213> ORGANISM: Homo sapiens

<400> SEQUENCE: 18

Ser Leu Thr Lys His Leu Pro Pro Leu
1               5

<210> SEQ ID NO 19
<211> LENGTH: 9
<212> TYPE: PRT
<213> ORGANISM: Homo sapiens

<400> SEQUENCE: 19

Ala Leu Ser Pro His Asn Ile Leu Leu
1               5

<210> SEQ ID NO 20
<211> LENGTH: 9
<212> TYPE: PRT
<213> ORGANISM: Homo sapiens

<400> SEQUENCE: 20

Ser Leu Ala Arg His Leu Met Thr Leu
1               5

<210> SEQ ID NO 21
<211> LENGTH: 9
<212> TYPE: PRT
<213> ORGANISM: Homo sapiens

<400> SEQUENCE: 21

Ala Leu Cys Pro His Leu Lys Thr Leu
1               5

<210> SEQ ID NO 22
<211> LENGTH: 9
<212> TYPE: PRT
<213> ORGANISM: Homo sapiens
<220> FEATURE:
<221> NAME/KEY: misc_feature
<222> LOCATION: (1)..(4)
<223> OTHER INFORMATION: Xaa can be any naturally occurring amino acid

<400> SEQUENCE: 22

Xaa Xaa Xaa Xaa His Leu Ile Gly Leu
1               5

<210> SEQ ID NO 23
<211> LENGTH: 9
<212> TYPE: PRT
<213> ORGANISM: Homo sapiens

<400> SEQUENCE: 23

His Pro Ser Gln His Leu Ile Gly Leu
1               5

<210> SEQ ID NO 24
```

```
<211> LENGTH: 9
<212> TYPE: PRT
<213> ORGANISM: Homo sapiens

<400> SEQUENCE: 24

Lys Val Leu Glu His Val Val Arg Val
1               5

<210> SEQ ID NO 25
<211> LENGTH: 9
<212> TYPE: PRT
<213> ORGANISM: Homo sapiens

<400> SEQUENCE: 25

Lys Val Leu Glu Tyr Val Ile Lys Val
1               5

<210> SEQ ID NO 26
<211> LENGTH: 9
<212> TYPE: PRT
<213> ORGANISM: Homo sapiens

<400> SEQUENCE: 26

Lys Val Leu Glu Phe Leu Ala Lys Val
1               5

<210> SEQ ID NO 27
<211> LENGTH: 9
<212> TYPE: PRT
<213> ORGANISM: Homo sapiens

<400> SEQUENCE: 27

Lys Ile Ile Asp Leu Leu Pro Lys Val
1               5

<210> SEQ ID NO 28
<211> LENGTH: 9
<212> TYPE: PRT
<213> ORGANISM: Homo sapiens

<400> SEQUENCE: 28

Lys Leu Gln Glu Phe Leu Gln Thr Leu
1               5

<210> SEQ ID NO 29
<211> LENGTH: 9
<212> TYPE: PRT
<213> ORGANISM: Homo sapiens

<400> SEQUENCE: 29

Lys Val Leu Glu Thr Leu Val Thr Val
1               5

<210> SEQ ID NO 30
<211> LENGTH: 9
<212> TYPE: PRT
<213> ORGANISM: Homo sapiens

<400> SEQUENCE: 30

Lys Leu Gly Ser Val Pro Val Thr Val
1               5

<210> SEQ ID NO 31
<211> LENGTH: 9
<212> TYPE: PRT
```

<213> ORGANISM: Homo sapiens

<400> SEQUENCE: 31

Lys Ile Ala Asp Phe Gly Trp Ser Val
1               5

<210> SEQ ID NO 32
<211> LENGTH: 9
<212> TYPE: PRT
<213> ORGANISM: Homo sapiens

<400> SEQUENCE: 32

Ser Phe Leu Val His Leu Ile Gly Leu
1               5

<210> SEQ ID NO 33
<211> LENGTH: 9
<212> TYPE: PRT
<213> ORGANISM: Homo sapiens

<400> SEQUENCE: 33

Arg Val Ser Trp His Leu Ile Gly Leu
1               5

<210> SEQ ID NO 34
<211> LENGTH: 9
<212> TYPE: PRT
<213> ORGANISM: Homo sapiens

<400> SEQUENCE: 34

Ile Asn Glu Ser His Leu Ile Gly Leu
1               5

<210> SEQ ID NO 35
<211> LENGTH: 9
<212> TYPE: PRT
<213> ORGANISM: Homo sapiens

<400> SEQUENCE: 35

Arg Arg Thr Leu His Leu Ile Gly Leu
1               5

<210> SEQ ID NO 36
<211> LENGTH: 9
<212> TYPE: PRT
<213> ORGANISM: Homo sapiens

<400> SEQUENCE: 36

Met Trp Ser Tyr His Leu Ile Gly Leu
1               5

<210> SEQ ID NO 37
<211> LENGTH: 9
<212> TYPE: PRT
<213> ORGANISM: Homo sapiens

<400> SEQUENCE: 37

Phe Thr Ala Gly His Leu Ile Gly Leu
1               5

<210> SEQ ID NO 38
<211> LENGTH: 9
<212> TYPE: PRT
<213> ORGANISM: Homo sapiens

-continued

```
<400> SEQUENCE: 38

Ala Leu Leu Gln His Leu Ile Gly Leu
1               5

<210> SEQ ID NO 39
<211> LENGTH: 9
<212> TYPE: PRT
<213> ORGANISM: Homo sapiens

<400> SEQUENCE: 39

Ser Ala Leu Gln His Leu Ile Gly Leu
1               5

<210> SEQ ID NO 40
<211> LENGTH: 9
<212> TYPE: PRT
<213> ORGANISM: Homo sapiens

<400> SEQUENCE: 40

Ser Leu Ala Gln His Leu Ile Gly Leu
1               5

<210> SEQ ID NO 41
<211> LENGTH: 9
<212> TYPE: PRT
<213> ORGANISM: Homo sapiens

<400> SEQUENCE: 41

Ser Leu Leu Ala His Leu Ile Gly Leu
1               5

<210> SEQ ID NO 42
<211> LENGTH: 9
<212> TYPE: PRT
<213> ORGANISM: Homo sapiens

<400> SEQUENCE: 42

Ser Leu Leu Gln Ala Leu Ile Gly Leu
1               5

<210> SEQ ID NO 43
<211> LENGTH: 9
<212> TYPE: PRT
<213> ORGANISM: Homo sapiens

<400> SEQUENCE: 43

Ser Leu Leu Gln His Ala Ile Gly Leu
1               5

<210> SEQ ID NO 44
<211> LENGTH: 9
<212> TYPE: PRT
<213> ORGANISM: Homo sapiens

<400> SEQUENCE: 44

Ser Leu Leu Gln His Leu Ala Gly Leu
1               5

<210> SEQ ID NO 45
<211> LENGTH: 9
<212> TYPE: PRT
<213> ORGANISM: Homo sapiens

<400> SEQUENCE: 45
```

```
Ser Leu Leu Gln His Leu Ile Ala Leu
1               5

<210> SEQ ID NO 46
<211> LENGTH: 9
<212> TYPE: PRT
<213> ORGANISM: Homo sapiens

<400> SEQUENCE: 46

Ser Leu Leu Gln His Leu Ile Gly Ala
1               5

<210> SEQ ID NO 47
<211> LENGTH: 10
<212> TYPE: PRT
<213> ORGANISM: Artificial sequence
<220> FEATURE:
<223> OTHER INFORMATION: TAA

<400> SEQUENCE: 47

Tyr Leu Tyr Asp Ser Glu Thr Lys Asn Ala
1               5                   10

<210> SEQ ID NO 48
<211> LENGTH: 9
<212> TYPE: PRT
<213> ORGANISM: Artificial sequence
<220> FEATURE:
<223> OTHER INFORMATION: TAA

<400> SEQUENCE: 48

His Leu Met Asp Gln Pro Leu Ser Val
1               5

<210> SEQ ID NO 49
<211> LENGTH: 9
<212> TYPE: PRT
<213> ORGANISM: Artificial sequence
<220> FEATURE:
<223> OTHER INFORMATION: TAA

<400> SEQUENCE: 49

Gly Leu Leu Lys Lys Ile Asn Ser Val
1               5

<210> SEQ ID NO 50
<211> LENGTH: 9
<212> TYPE: PRT
<213> ORGANISM: Artificial sequence
<220> FEATURE:
<223> OTHER INFORMATION: TAA

<400> SEQUENCE: 50

Phe Leu Val Asp Gly Ser Ser Ala Leu
1               5

<210> SEQ ID NO 51
<211> LENGTH: 10
<212> TYPE: PRT
<213> ORGANISM: Artificial sequence
<220> FEATURE:
<223> OTHER INFORMATION: TAA

<400> SEQUENCE: 51

Phe Leu Phe Asp Gly Ser Ala Asn Leu Val
1               5                   10
```

```
<210> SEQ ID NO 52
<211> LENGTH: 9
<212> TYPE: PRT
<213> ORGANISM: Artificial sequence
<220> FEATURE:
<223> OTHER INFORMATION: TAA

<400> SEQUENCE: 52

Phe Leu Tyr Lys Ile Ile Asp Glu Leu
1               5

<210> SEQ ID NO 53
<211> LENGTH: 11
<212> TYPE: PRT
<213> ORGANISM: Artificial sequence
<220> FEATURE:
<223> OTHER INFORMATION: TAA

<400> SEQUENCE: 53

Phe Ile Leu Asp Ser Ala Glu Thr Thr Thr Leu
1               5                   10

<210> SEQ ID NO 54
<211> LENGTH: 9
<212> TYPE: PRT
<213> ORGANISM: Artificial sequence
<220> FEATURE:
<223> OTHER INFORMATION: TAA

<400> SEQUENCE: 54

Ser Val Asp Val Ser Pro Pro Lys Val
1               5

<210> SEQ ID NO 55
<211> LENGTH: 8
<212> TYPE: PRT
<213> ORGANISM: Artificial sequence
<220> FEATURE:
<223> OTHER INFORMATION: TAA

<400> SEQUENCE: 55

Val Ala Asp Lys Ile His Ser Val
1               5

<210> SEQ ID NO 56
<211> LENGTH: 9
<212> TYPE: PRT
<213> ORGANISM: Artificial sequence
<220> FEATURE:
<223> OTHER INFORMATION: TAA

<400> SEQUENCE: 56

Ile Val Asp Asp Leu Thr Ile Asn Leu
1               5

<210> SEQ ID NO 57
<211> LENGTH: 9
<212> TYPE: PRT
<213> ORGANISM: Artificial sequence
<220> FEATURE:
<223> OTHER INFORMATION: TAA

<400> SEQUENCE: 57

Gly Leu Leu Glu Glu Leu Val Thr Val
1               5
```

<210> SEQ ID NO 58
<211> LENGTH: 10
<212> TYPE: PRT
<213> ORGANISM: Artificial sequence
<220> FEATURE:
<223> OTHER INFORMATION: TAA

<400> SEQUENCE: 58

Thr Leu Asp Gly Ala Ala Val Asn Gln Val
1               5                   10

<210> SEQ ID NO 59
<211> LENGTH: 10
<212> TYPE: PRT
<213> ORGANISM: Artificial sequence
<220> FEATURE:
<223> OTHER INFORMATION: TAA

<400> SEQUENCE: 59

Ser Val Leu Glu Lys Glu Ile Tyr Ser Ile
1               5                   10

<210> SEQ ID NO 60
<211> LENGTH: 9
<212> TYPE: PRT
<213> ORGANISM: Artificial sequence
<220> FEATURE:
<223> OTHER INFORMATION: TAA

<400> SEQUENCE: 60

Leu Leu Asp Pro Lys Thr Ile Phe Leu
1               5

<210> SEQ ID NO 61
<211> LENGTH: 25
<212> TYPE: PRT
<213> ORGANISM: Artificial sequence
<220> FEATURE:
<223> OTHER INFORMATION: Linker

<400> SEQUENCE: 61

Gly Gly Ser Gly Gly Gly Gly Ser Gly Gly Gly Ser Gly Gly Gly
1               5                   10                  15

Gly Ser Gly Gly Gly Ser Gly Gly
            20                  25

<210> SEQ ID NO 62
<211> LENGTH: 9
<212> TYPE: PRT
<213> ORGANISM: Artificial sequence
<220> FEATURE:
<223> OTHER INFORMATION: TAA

<400> SEQUENCE: 62

Tyr Leu Met Asp Asp Phe Ser Ser Leu
1               5

<210> SEQ ID NO 63
<211> LENGTH: 9
<212> TYPE: PRT
<213> ORGANISM: Artificial sequence
<220> FEATURE:
<223> OTHER INFORMATION: TAA

<400> SEQUENCE: 63

Lys Val Trp Ser Asp Val Thr Pro Leu
1               5

<210> SEQ ID NO 64
<211> LENGTH: 11
<212> TYPE: PRT
<213> ORGANISM: Artificial sequence
<220> FEATURE:
<223> OTHER INFORMATION: TAA

<400> SEQUENCE: 64

Leu Leu Trp Gly His Pro Arg Val Ala Leu Ala
1               5                   10

<210> SEQ ID NO 65
<211> LENGTH: 11
<212> TYPE: PRT
<213> ORGANISM: Artificial sequence
<220> FEATURE:
<223> OTHER INFORMATION: TAA

<400> SEQUENCE: 65

Lys Ile Trp Glu Glu Leu Ser Val Leu Glu Val
1               5                   10

<210> SEQ ID NO 66
<211> LENGTH: 9
<212> TYPE: PRT
<213> ORGANISM: Artificial sequence
<220> FEATURE:
<223> OTHER INFORMATION: TAA

<400> SEQUENCE: 66

Leu Leu Ile Pro Phe Thr Ile Phe Met
1               5

<210> SEQ ID NO 67
<211> LENGTH: 9
<212> TYPE: PRT
<213> ORGANISM: Artificial sequence
<220> FEATURE:
<223> OTHER INFORMATION: TAA

<400> SEQUENCE: 67

Phe Leu Ile Glu Asn Leu Leu Ala Ala
1               5

<210> SEQ ID NO 68
<211> LENGTH: 11
<212> TYPE: PRT
<213> ORGANISM: Artificial sequence
<220> FEATURE:
<223> OTHER INFORMATION: TAA

<400> SEQUENCE: 68

Leu Leu Trp Gly His Pro Arg Val Ala Leu Ala
1               5                   10

<210> SEQ ID NO 69
<211> LENGTH: 9
<212> TYPE: PRT
<213> ORGANISM: Artificial sequence
<220> FEATURE:
<223> OTHER INFORMATION: TAA

<400> SEQUENCE: 69

Phe Leu Leu Glu Arg Glu Gln Leu Leu
1               5

```
<210> SEQ ID NO 70
<211> LENGTH: 9
<212> TYPE: PRT
<213> ORGANISM: Artificial sequence
<220> FEATURE:
<223> OTHER INFORMATION: TAA

<400> SEQUENCE: 70

Ser Leu Ala Glu Thr Ile Phe Ile Val
1               5

<210> SEQ ID NO 71
<211> LENGTH: 9
<212> TYPE: PRT
<213> ORGANISM: Artificial sequence
<220> FEATURE:
<223> OTHER INFORMATION: TAA

<400> SEQUENCE: 71

Thr Leu Leu Glu Gly Ile Ser Arg Ala
1               5

<210> SEQ ID NO 72
<211> LENGTH: 9
<212> TYPE: PRT
<213> ORGANISM: Artificial sequence
<220> FEATURE:
<223> OTHER INFORMATION: TAA

<400> SEQUENCE: 72

Ile Leu Gln Asp Gly Gln Phe Leu Val
1               5

<210> SEQ ID NO 73
<211> LENGTH: 10
<212> TYPE: PRT
<213> ORGANISM: Artificial sequence
<220> FEATURE:
<223> OTHER INFORMATION: TAA

<400> SEQUENCE: 73

Val Ile Phe Glu Gly Glu Pro Met Tyr Leu
1               5                   10

<210> SEQ ID NO 74
<211> LENGTH: 9
<212> TYPE: PRT
<213> ORGANISM: Artificial sequence
<220> FEATURE:
<223> OTHER INFORMATION: TAA

<400> SEQUENCE: 74

Ser Leu Phe Glu Ser Leu Glu Tyr Leu
1               5

<210> SEQ ID NO 75
<211> LENGTH: 9
<212> TYPE: PRT
<213> ORGANISM: Artificial sequence
<220> FEATURE:
<223> OTHER INFORMATION: TAA

<400> SEQUENCE: 75

Ser Leu Leu Asn Gln Pro Lys Ala Val
1               5
```

```
<210> SEQ ID NO 76
<211> LENGTH: 9
<212> TYPE: PRT
<213> ORGANISM: Artificial sequence
<220> FEATURE:
<223> OTHER INFORMATION: TAA

<400> SEQUENCE: 76

Gly Leu Ala Glu Phe Gln Glu Asn Val
1               5

<210> SEQ ID NO 77
<211> LENGTH: 9
<212> TYPE: PRT
<213> ORGANISM: Artificial sequence
<220> FEATURE:
<223> OTHER INFORMATION: TAA

<400> SEQUENCE: 77

Lys Leu Leu Ala Val Ile His Glu Leu
1               5

<210> SEQ ID NO 78
<211> LENGTH: 9
<212> TYPE: PRT
<213> ORGANISM: Artificial sequence
<220> FEATURE:
<223> OTHER INFORMATION: TAA

<400> SEQUENCE: 78

Thr Leu His Asp Gln Val His Leu Leu
1               5

<210> SEQ ID NO 79
<211> LENGTH: 11
<212> TYPE: PRT
<213> ORGANISM: Artificial sequence
<220> FEATURE:
<223> OTHER INFORMATION: TAA

<400> SEQUENCE: 79

Thr Leu Tyr Asn Pro Glu Arg Thr Ile Thr Val
1               5                   10

<210> SEQ ID NO 80
<211> LENGTH: 9
<212> TYPE: PRT
<213> ORGANISM: Artificial sequence
<220> FEATURE:
<223> OTHER INFORMATION: TAA

<400> SEQUENCE: 80

Lys Leu Gln Glu Lys Ile Gln Glu Leu
1               5

<210> SEQ ID NO 81
<211> LENGTH: 10
<212> TYPE: PRT
<213> ORGANISM: Artificial sequence
<220> FEATURE:
<223> OTHER INFORMATION: TAA

<400> SEQUENCE: 81

Ser Val Leu Glu Lys Glu Ile Tyr Ser Ile
1               5                   10

<210> SEQ ID NO 82
```

```
<211> LENGTH: 11
<212> TYPE: PRT
<213> ORGANISM: Artificial sequence
<220> FEATURE:
<223> OTHER INFORMATION: TAA

<400> SEQUENCE: 82

Arg Val Ile Asp Asp Ser Leu Val Val Gly Val
1               5                   10

<210> SEQ ID NO 83
<211> LENGTH: 9
<212> TYPE: PRT
<213> ORGANISM: Artificial sequence
<220> FEATURE:
<223> OTHER INFORMATION: TAA

<400> SEQUENCE: 83

Val Leu Phe Gly Glu Leu Pro Ala Leu
1               5

<210> SEQ ID NO 84
<211> LENGTH: 9
<212> TYPE: PRT
<213> ORGANISM: Artificial sequence
<220> FEATURE:
<223> OTHER INFORMATION: TAA

<400> SEQUENCE: 84

Gly Leu Val Asp Ile Met Val His Leu
1               5

<210> SEQ ID NO 85
<211> LENGTH: 9
<212> TYPE: PRT
<213> ORGANISM: Artificial sequence
<220> FEATURE:
<223> OTHER INFORMATION: TAA

<400> SEQUENCE: 85

Phe Leu Asn Ala Ile Glu Thr Ala Leu
1               5

<210> SEQ ID NO 86
<211> LENGTH: 9
<212> TYPE: PRT
<213> ORGANISM: Artificial sequence
<220> FEATURE:
<223> OTHER INFORMATION: TAA

<400> SEQUENCE: 86

Ala Leu Leu Gln Ala Leu Met Glu Leu
1               5

<210> SEQ ID NO 87
<211> LENGTH: 9
<212> TYPE: PRT
<213> ORGANISM: Artificial sequence
<220> FEATURE:
<223> OTHER INFORMATION: TAA

<400> SEQUENCE: 87

Ala Leu Ser Ser Ser Gln Ala Glu Val
1               5

<210> SEQ ID NO 88
<211> LENGTH: 11
```

```
<212> TYPE: PRT
<213> ORGANISM: Artificial sequence
<220> FEATURE:
<223> OTHER INFORMATION: TAA

<400> SEQUENCE: 88

Ser Leu Ile Thr Gly Gln Asp Leu Leu Ser Val
1               5                   10

<210> SEQ ID NO 89
<211> LENGTH: 9
<212> TYPE: PRT
<213> ORGANISM: Artificial sequence
<220> FEATURE:
<223> OTHER INFORMATION: TAA

<400> SEQUENCE: 89

Gln Leu Ile Glu Lys Asn Trp Leu Leu
1               5

<210> SEQ ID NO 90
<211> LENGTH: 9
<212> TYPE: PRT
<213> ORGANISM: Artificial sequence
<220> FEATURE:
<223> OTHER INFORMATION: TAA

<400> SEQUENCE: 90

Leu Leu Asp Pro Lys Thr Ile Phe Leu
1               5

<210> SEQ ID NO 91
<211> LENGTH: 9
<212> TYPE: PRT
<213> ORGANISM: Artificial sequence
<220> FEATURE:
<223> OTHER INFORMATION: TAA

<400> SEQUENCE: 91

Arg Leu His Asp Glu Asn Ile Leu Leu
1               5

<210> SEQ ID NO 92
<211> LENGTH: 17
<212> TYPE: PRT
<213> ORGANISM: Artificial sequence
<220> FEATURE:
<223> OTHER INFORMATION: Linker

<400> SEQUENCE: 92

Gly Ser Ala Asp Asp Ala Lys Lys Asp Ala Ala Lys Lys Asp Gly Lys
1               5                   10                  15

Ser

<210> SEQ ID NO 93
<211> LENGTH: 9
<212> TYPE: PRT
<213> ORGANISM: Artificial sequence
<220> FEATURE:
<223> OTHER INFORMATION: TAA

<400> SEQUENCE: 93

Gly Leu Pro Ser Ala Thr Thr Thr Val
1               5

<210> SEQ ID NO 94
```

```
<211> LENGTH: 11
<212> TYPE: PRT
<213> ORGANISM: Artificial sequence
<220> FEATURE:
<223> OTHER INFORMATION: TAA

<400> SEQUENCE: 94

Gly Leu Leu Pro Ser Ala Glu Ser Ile Lys Leu
1               5                   10

<210> SEQ ID NO 95
<211> LENGTH: 9
<212> TYPE: PRT
<213> ORGANISM: Artificial sequence
<220> FEATURE:
<223> OTHER INFORMATION: TAA

<400> SEQUENCE: 95

Lys Thr Ala Ser Ile Asn Gln Asn Val
1               5

<210> SEQ ID NO 96
<211> LENGTH: 9
<212> TYPE: PRT
<213> ORGANISM: Artificial sequence
<220> FEATURE:
<223> OTHER INFORMATION: TAA

<400> SEQUENCE: 96

Tyr Leu Met Asp Asp Phe Ser Ser Leu
1               5

<210> SEQ ID NO 97
<211> LENGTH: 9
<212> TYPE: PRT
<213> ORGANISM: Artificial sequence
<220> FEATURE:
<223> OTHER INFORMATION: TAA

<400> SEQUENCE: 97

Leu Met Tyr Pro Tyr Ile Tyr His Val
1               5

<210> SEQ ID NO 98
<211> LENGTH: 9
<212> TYPE: PRT
<213> ORGANISM: Artificial sequence
<220> FEATURE:
<223> OTHER INFORMATION: TAA

<400> SEQUENCE: 98

Lys Val Trp Ser Asp Val Thr Pro Leu
1               5

<210> SEQ ID NO 99
<211> LENGTH: 11
<212> TYPE: PRT
<213> ORGANISM: Artificial sequence
<220> FEATURE:
<223> OTHER INFORMATION: TAA

<400> SEQUENCE: 99

Leu Leu Trp Gly His Pro Arg Val Ala Leu Ala
1               5                   10

<210> SEQ ID NO 100
<211> LENGTH: 9
```

-continued

<212> TYPE: PRT
<213> ORGANISM: Artificial sequence
<220> FEATURE:
<223> OTHER INFORMATION: TAA

<400> SEQUENCE: 100

Val Leu Asp Gly Lys Val Ala Val Val
1               5

<210> SEQ ID NO 101
<211> LENGTH: 9
<212> TYPE: PRT
<213> ORGANISM: Artificial sequence
<220> FEATURE:
<223> OTHER INFORMATION: TAA

<400> SEQUENCE: 101

Gly Leu Leu Gly Lys Val Thr Ser Val
1               5

<210> SEQ ID NO 102
<211> LENGTH: 9
<212> TYPE: PRT
<213> ORGANISM: Artificial sequence
<220> FEATURE:
<223> OTHER INFORMATION: TAA

<400> SEQUENCE: 102

Lys Met Ile Ser Ala Ile Pro Thr Leu
1               5

<210> SEQ ID NO 103
<211> LENGTH: 11
<212> TYPE: PRT
<213> ORGANISM: Artificial sequence
<220> FEATURE:
<223> OTHER INFORMATION: TAA

<400> SEQUENCE: 103

Gly Leu Leu Glu Thr Thr Gly Leu Leu Ala Thr
1               5                   10

<210> SEQ ID NO 104
<211> LENGTH: 9
<212> TYPE: PRT
<213> ORGANISM: Artificial sequence
<220> FEATURE:
<223> OTHER INFORMATION: TAA

<400> SEQUENCE: 104

Thr Leu Asn Thr Leu Asp Ile Asn Leu
1               5

<210> SEQ ID NO 105
<211> LENGTH: 9
<212> TYPE: PRT
<213> ORGANISM: Artificial sequence
<220> FEATURE:
<223> OTHER INFORMATION: TAA

<400> SEQUENCE: 105

Val Ile Ile Lys Gly Leu Glu Glu Ile
1               5

<210> SEQ ID NO 106
<211> LENGTH: 9
<212> TYPE: PRT

<213> ORGANISM: Artificial sequence
<220> FEATURE:
<223> OTHER INFORMATION: TAA

<400> SEQUENCE: 106

Tyr Leu Glu Asp Gly Phe Ala Tyr Val
1               5

<210> SEQ ID NO 107
<211> LENGTH: 11
<212> TYPE: PRT
<213> ORGANISM: Artificial sequence
<220> FEATURE:
<223> OTHER INFORMATION: TAA

<400> SEQUENCE: 107

Lys Ile Trp Glu Glu Leu Ser Val Leu Glu Val
1               5                   10

<210> SEQ ID NO 108
<211> LENGTH: 9
<212> TYPE: PRT
<213> ORGANISM: Artificial sequence
<220> FEATURE:
<223> OTHER INFORMATION: TAA

<400> SEQUENCE: 108

Leu Leu Ile Pro Phe Thr Ile Phe Met
1               5

<210> SEQ ID NO 109
<211> LENGTH: 10
<212> TYPE: PRT
<213> ORGANISM: Artificial sequence
<220> FEATURE:
<223> OTHER INFORMATION: TAA

<400> SEQUENCE: 109

Ile Ser Leu Asp Glu Val Ala Val Ser Leu
1               5                   10

<210> SEQ ID NO 110
<211> LENGTH: 10
<212> TYPE: PRT
<213> ORGANISM: Artificial sequence
<220> FEATURE:
<223> OTHER INFORMATION: TAA

<400> SEQUENCE: 110

Lys Ile Ser Asp Phe Gly Leu Ala Thr Val
1               5                   10

<210> SEQ ID NO 111
<211> LENGTH: 11
<212> TYPE: PRT
<213> ORGANISM: Artificial sequence
<220> FEATURE:
<223> OTHER INFORMATION: TAA

<400> SEQUENCE: 111

Lys Leu Ile Gly Asn Ile His Gly Asn Glu Val
1               5                   10

<210> SEQ ID NO 112
<211> LENGTH: 9
<212> TYPE: PRT
<213> ORGANISM: Artificial sequence -continued

```
<220> FEATURE:
<223> OTHER INFORMATION: TAA

<400> SEQUENCE: 112

Ile Leu Leu Ser Val Leu His Gln Leu
1               5

<210> SEQ ID NO 113
<211> LENGTH: 9
<212> TYPE: PRT
<213> ORGANISM: Artificial sequence
<220> FEATURE:
<223> OTHER INFORMATION: TAA

<400> SEQUENCE: 113

Leu Asp Ser Glu Ala Leu Leu Thr Leu
1               5

<210> SEQ ID NO 114
<211> LENGTH: 13
<212> TYPE: PRT
<213> ORGANISM: Artificial sequence
<220> FEATURE:
<223> OTHER INFORMATION: TAA

<400> SEQUENCE: 114

Val Leu Gln Glu Asn Ser Ser Asp Tyr Gln Ser Asn Leu
1               5                   10

<210> SEQ ID NO 115
<211> LENGTH: 11
<212> TYPE: PRT
<213> ORGANISM: Artificial sequence
<220> FEATURE:
<223> OTHER INFORMATION: TAA

<400> SEQUENCE: 115

His Leu Leu Gly Glu Gly Ala Phe Ala Gln Val
1               5                   10

<210> SEQ ID NO 116
<211> LENGTH: 9
<212> TYPE: PRT
<213> ORGANISM: Artificial sequence
<220> FEATURE:
<223> OTHER INFORMATION: TAA

<400> SEQUENCE: 116

Ser Leu Val Glu Asn Ile His Val Leu
1               5

<210> SEQ ID NO 117
<211> LENGTH: 7
<212> TYPE: PRT
<213> ORGANISM: Artificial sequence
<220> FEATURE:
<223> OTHER INFORMATION: TAA

<400> SEQUENCE: 117

Gly Gly Gly Gly Ser Gly Thr
1               5

<210> SEQ ID NO 118
<211> LENGTH: 9
<212> TYPE: PRT
<213> ORGANISM: Artificial sequence
<220> FEATURE:
```

```
<223> OTHER INFORMATION: TAA

<400> SEQUENCE: 118

Ser Leu Ser Glu Lys Ser Pro Glu Val
1               5

<210> SEQ ID NO 119
<211> LENGTH: 10
<212> TYPE: PRT
<213> ORGANISM: Artificial sequence
<220> FEATURE:
<223> OTHER INFORMATION: TAA

<400> SEQUENCE: 119

Ala Met Phe Pro Asp Thr Ile Pro Arg Val
1               5                   10

<210> SEQ ID NO 120
<211> LENGTH: 9
<212> TYPE: PRT
<213> ORGANISM: Artificial sequence
<220> FEATURE:
<223> OTHER INFORMATION: TAA

<400> SEQUENCE: 120

Phe Leu Ile Glu Asn Leu Leu Ala Ala
1               5

<210> SEQ ID NO 121
<211> LENGTH: 9
<212> TYPE: PRT
<213> ORGANISM: Artificial sequence
<220> FEATURE:
<223> OTHER INFORMATION: TAA

<400> SEQUENCE: 121

Phe Thr Ala Glu Phe Leu Glu Lys Val
1               5

<210> SEQ ID NO 122
<211> LENGTH: 9
<212> TYPE: PRT
<213> ORGANISM: Artificial sequence
<220> FEATURE:
<223> OTHER INFORMATION: TAA

<400> SEQUENCE: 122

Ala Leu Tyr Gly Asn Val Gln Gln Val
1               5

<210> SEQ ID NO 123
<211> LENGTH: 9
<212> TYPE: PRT
<213> ORGANISM: Artificial sequence
<220> FEATURE:
<223> OTHER INFORMATION: TAA

<400> SEQUENCE: 123

Leu Phe Gln Ser Arg Ile Ala Gly Val
1               5

<210> SEQ ID NO 124
<211> LENGTH: 11
<212> TYPE: PRT
<213> ORGANISM: Artificial sequence
<220> FEATURE:
<223> OTHER INFORMATION: TAA
```

```
<400> SEQUENCE: 124

Ile Leu Ala Glu Glu Pro Ile Tyr Ile Arg Val
1               5                   10

<210> SEQ ID NO 125
<211> LENGTH: 9
<212> TYPE: PRT
<213> ORGANISM: Artificial sequence
<220> FEATURE:
<223> OTHER INFORMATION: TAA

<400> SEQUENCE: 125

Phe Leu Leu Glu Arg Glu Gln Leu Leu
1               5

<210> SEQ ID NO 126
<211> LENGTH: 10
<212> TYPE: PRT
<213> ORGANISM: Artificial sequence
<220> FEATURE:
<223> OTHER INFORMATION: TAA

<400> SEQUENCE: 126

Leu Leu Leu Pro Leu Glu Leu Ser Leu Ala
1               5                   10

<210> SEQ ID NO 127
<211> LENGTH: 9
<212> TYPE: PRT
<213> ORGANISM: Artificial sequence
<220> FEATURE:
<223> OTHER INFORMATION: TAA

<400> SEQUENCE: 127

Ser Leu Ala Glu Thr Ile Phe Ile Val
1               5

<210> SEQ ID NO 128
<211> LENGTH: 11
<212> TYPE: PRT
<213> ORGANISM: Artificial sequence
<220> FEATURE:
<223> OTHER INFORMATION: TAA

<400> SEQUENCE: 128

Ala Ile Leu Asn Val Asp Glu Lys Asn Gln Val
1               5                   10

<210> SEQ ID NO 129
<211> LENGTH: 9
<212> TYPE: PRT
<213> ORGANISM: Artificial sequence
<220> FEATURE:
<223> OTHER INFORMATION: TAA

<400> SEQUENCE: 129

Arg Leu Phe Glu Glu Val Leu Gly Val
1               5

<210> SEQ ID NO 130
<211> LENGTH: 9
<212> TYPE: PRT
<213> ORGANISM: Artificial sequence
<220> FEATURE:
<223> OTHER INFORMATION: TAA
```

```
<400> SEQUENCE: 130

Tyr Leu Asp Glu Val Ala Phe Met Leu
1               5

<210> SEQ ID NO 131
<211> LENGTH: 11
<212> TYPE: PRT
<213> ORGANISM: Artificial sequence
<220> FEATURE:
<223> OTHER INFORMATION: TAA

<400> SEQUENCE: 131

Lys Leu Ile Asp Glu Asp Glu Pro Leu Phe Leu
1               5                   10

<210> SEQ ID NO 132
<211> LENGTH: 9
<212> TYPE: PRT
<213> ORGANISM: Artificial sequence
<220> FEATURE:
<223> OTHER INFORMATION: TAA

<400> SEQUENCE: 132

Lys Leu Phe Glu Lys Ser Thr Gly Leu
1               5

<210> SEQ ID NO 133
<211> LENGTH: 11
<212> TYPE: PRT
<213> ORGANISM: Artificial sequence
<220> FEATURE:
<223> OTHER INFORMATION: TAA

<400> SEQUENCE: 133

Ser Leu Leu Glu Val Asn Glu Ala Ser Ser Val
1               5                   10

<210> SEQ ID NO 134
<211> LENGTH: 10
<212> TYPE: PRT
<213> ORGANISM: Artificial sequence
<220> FEATURE:
<223> OTHER INFORMATION: TAA

<400> SEQUENCE: 134

Gly Val Tyr Asp Gly Arg Glu His Thr Val
1               5                   10

<210> SEQ ID NO 135
<211> LENGTH: 10
<212> TYPE: PRT
<213> ORGANISM: Artificial sequence
<220> FEATURE:
<223> OTHER INFORMATION: TAA

<400> SEQUENCE: 135

Gly Leu Tyr Pro Val Thr Leu Val Gly Val
1               5                   10

<210> SEQ ID NO 136
<211> LENGTH: 9
<212> TYPE: PRT
<213> ORGANISM: Artificial sequence
<220> FEATURE:
<223> OTHER INFORMATION: TAA

<400> SEQUENCE: 136
```

Ala Leu Leu Ser Ser Val Ala Glu Ala
1               5

<210> SEQ ID NO 137
<211> LENGTH: 9
<212> TYPE: PRT
<213> ORGANISM: Artificial sequence
<220> FEATURE:
<223> OTHER INFORMATION: TAA

<400> SEQUENCE: 137

Thr Leu Leu Glu Gly Ile Ser Arg Ala
1               5

<210> SEQ ID NO 138
<211> LENGTH: 9
<212> TYPE: PRT
<213> ORGANISM: Artificial sequence
<220> FEATURE:
<223> OTHER INFORMATION: TAA

<400> SEQUENCE: 138

Ser Leu Ile Glu Glu Ser Glu Glu Leu
1               5

<210> SEQ ID NO 139
<211> LENGTH: 9
<212> TYPE: PRT
<213> ORGANISM: Artificial sequence
<220> FEATURE:
<223> OTHER INFORMATION: TAA

<400> SEQUENCE: 139

Ala Leu Tyr Val Gln Ala Pro Thr Val
1               5

<210> SEQ ID NO 140
<211> LENGTH: 10
<212> TYPE: PRT
<213> ORGANISM: Artificial sequence
<220> FEATURE:
<223> OTHER INFORMATION: TAA

<400> SEQUENCE: 140

Lys Leu Ile Tyr Lys Asp Leu Val Ser Val
1               5                   10

<210> SEQ ID NO 141
<211> LENGTH: 9
<212> TYPE: PRT
<213> ORGANISM: Artificial sequence
<220> FEATURE:
<223> OTHER INFORMATION: TAA

<400> SEQUENCE: 141

Ile Leu Gln Asp Gly Gln Phe Leu Val
1               5

<210> SEQ ID NO 142
<211> LENGTH: 9
<212> TYPE: PRT
<213> ORGANISM: Artificial sequence
<220> FEATURE:
<223> OTHER INFORMATION: TAA

<400> SEQUENCE: 142

```
Ser Leu Leu Asp Tyr Glu Val Ser Ile
1               5
```

<210> SEQ ID NO 143
<211> LENGTH: 9
<212> TYPE: PRT
<213> ORGANISM: Artificial sequence
<220> FEATURE:
<223> OTHER INFORMATION: TAA

<400> SEQUENCE: 143

```
Leu Leu Gly Asp Ser Ser Phe Phe Leu
1               5
```

<210> SEQ ID NO 144
<211> LENGTH: 10
<212> TYPE: PRT
<213> ORGANISM: Artificial sequence
<220> FEATURE:
<223> OTHER INFORMATION: TAA

<400> SEQUENCE: 144

```
Val Ile Phe Glu Gly Glu Pro Met Tyr Leu
1               5                   10
```

<210> SEQ ID NO 145
<211> LENGTH: 9
<212> TYPE: PRT
<213> ORGANISM: Artificial sequence
<220> FEATURE:
<223> OTHER INFORMATION: TAA

<400> SEQUENCE: 145

```
Ala Leu Ser Tyr Ile Leu Pro Tyr Leu
1               5
```

<210> SEQ ID NO 146
<211> LENGTH: 9
<212> TYPE: PRT
<213> ORGANISM: Artificial sequence
<220> FEATURE:
<223> OTHER INFORMATION: TAA

<400> SEQUENCE: 146

```
Phe Leu Phe Val Asp Pro Glu Leu Val
1               5
```

<210> SEQ ID NO 147
<211> LENGTH: 11
<212> TYPE: PRT
<213> ORGANISM: Artificial sequence
<220> FEATURE:
<223> OTHER INFORMATION: TAA

<400> SEQUENCE: 147

```
Ser Glu Trp Gly Ser Pro His Ala Ala Val Pro
1               5                   10
```

<210> SEQ ID NO 148
<211> LENGTH: 9
<212> TYPE: PRT
<213> ORGANISM: Artificial sequence
<220> FEATURE:
<223> OTHER INFORMATION: TAA

<400> SEQUENCE: 148

```
Ala Leu Ser Glu Leu Glu Arg Val Leu
```

```
1               5
```

<210> SEQ ID NO 149
<211> LENGTH: 9
<212> TYPE: PRT
<213> ORGANISM: Artificial sequence
<220> FEATURE:
<223> OTHER INFORMATION: TAA

<400> SEQUENCE: 149

```
Ser Leu Phe Glu Ser Leu Glu Tyr Leu
1               5
```

<210> SEQ ID NO 150
<211> LENGTH: 9
<212> TYPE: PRT
<213> ORGANISM: Artificial sequence
<220> FEATURE:
<223> OTHER INFORMATION: TAA

<400> SEQUENCE: 150

```
Lys Val Leu Glu Tyr Val Ile Lys Val
1               5
```

<210> SEQ ID NO 151
<211> LENGTH: 10
<212> TYPE: PRT
<213> ORGANISM: Artificial sequence
<220> FEATURE:
<223> OTHER INFORMATION: TAA

<400> SEQUENCE: 151

```
Val Leu Leu Asn Glu Ile Leu Glu Gln Val
1               5                   10
```

<210> SEQ ID NO 152
<211> LENGTH: 9
<212> TYPE: PRT
<213> ORGANISM: Artificial sequence
<220> FEATURE:
<223> OTHER INFORMATION: TAA

<400> SEQUENCE: 152

```
Ser Leu Leu Asn Gln Pro Lys Ala Val
1               5
```

<210> SEQ ID NO 153
<211> LENGTH: 9
<212> TYPE: PRT
<213> ORGANISM: Artificial sequence
<220> FEATURE:
<223> OTHER INFORMATION: TAA

<400> SEQUENCE: 153

```
Lys Met Ser Glu Leu Gln Thr Tyr Val
1               5
```

<210> SEQ ID NO 154
<211> LENGTH: 11
<212> TYPE: PRT
<213> ORGANISM: Artificial sequence
<220> FEATURE:
<223> OTHER INFORMATION: TAA

<400> SEQUENCE: 154

```
Ala Leu Leu Glu Gln Thr Gly Asp Met Ser Leu
1               5                   10
```

<210> SEQ ID NO 155
<211> LENGTH: 11
<212> TYPE: PRT
<213> ORGANISM: Artificial sequence
<220> FEATURE:
<223> OTHER INFORMATION: TAA

<400> SEQUENCE: 155

Val Ile Ile Lys Gly Leu Glu Glu Ile Thr Val
1               5                   10

<210> SEQ ID NO 156
<211> LENGTH: 9
<212> TYPE: PRT
<213> ORGANISM: Artificial sequence
<220> FEATURE:
<223> OTHER INFORMATION: TAA

<400> SEQUENCE: 156

Lys Gln Phe Glu Gly Thr Val Glu Ile
1               5

<210> SEQ ID NO 157
<211> LENGTH: 9
<212> TYPE: PRT
<213> ORGANISM: Artificial sequence
<220> FEATURE:
<223> OTHER INFORMATION: TAA

<400> SEQUENCE: 157

Lys Leu Gln Glu Glu Ile Pro Val Leu
1               5

<210> SEQ ID NO 158
<211> LENGTH: 9
<212> TYPE: PRT
<213> ORGANISM: Artificial sequence
<220> FEATURE:
<223> OTHER INFORMATION: TAA

<400> SEQUENCE: 158

Gly Leu Ala Glu Phe Gln Glu Asn Val
1               5

<210> SEQ ID NO 159
<211> LENGTH: 9
<212> TYPE: PRT
<213> ORGANISM: Artificial sequence
<220> FEATURE:
<223> OTHER INFORMATION: TAA

<400> SEQUENCE: 159

Asn Val Ala Glu Ile Val Ile His Ile
1               5

<210> SEQ ID NO 160
<211> LENGTH: 9
<212> TYPE: PRT
<213> ORGANISM: Artificial sequence
<220> FEATURE:
<223> OTHER INFORMATION: TAA

<400> SEQUENCE: 160

Ala Leu Ala Gly Ile Val Thr Asn Val
1               5

```
<210> SEQ ID NO 161
<211> LENGTH: 12
<212> TYPE: PRT
<213> ORGANISM: Artificial sequence
<220> FEATURE:
<223> OTHER INFORMATION: TAA

<400> SEQUENCE: 161

Asn Leu Leu Ile Asp Asp Lys Gly Thr Ile Lys Leu
1               5                   10

<210> SEQ ID NO 162
<211> LENGTH: 10
<212> TYPE: PRT
<213> ORGANISM: Artificial sequence
<220> FEATURE:
<223> OTHER INFORMATION: TAA

<400> SEQUENCE: 162

Val Leu Met Gln Asp Ser Arg Leu Tyr Leu
1               5                   10

<210> SEQ ID NO 163
<211> LENGTH: 9
<212> TYPE: PRT
<213> ORGANISM: Artificial sequence
<220> FEATURE:
<223> OTHER INFORMATION: TAA

<400> SEQUENCE: 163

Leu Leu Trp Gly Asn Leu Pro Glu Ile
1               5

<210> SEQ ID NO 164
<211> LENGTH: 9
<212> TYPE: PRT
<213> ORGANISM: Artificial sequence
<220> FEATURE:
<223> OTHER INFORMATION: TAA

<400> SEQUENCE: 164

Ser Leu Met Glu Lys Asn Gln Ser Leu
1               5

<210> SEQ ID NO 165
<211> LENGTH: 9
<212> TYPE: PRT
<213> ORGANISM: Artificial sequence
<220> FEATURE:
<223> OTHER INFORMATION: TAA

<400> SEQUENCE: 165

Lys Leu Leu Ala Val Ile His Glu Leu
1               5

<210> SEQ ID NO 166
<211> LENGTH: 10
<212> TYPE: PRT
<213> ORGANISM: Artificial sequence
<220> FEATURE:
<223> OTHER INFORMATION: TAA

<400> SEQUENCE: 166

Ala Leu Gly Asp Lys Phe Leu Leu Arg Val
1               5                   10
```

```
<210> SEQ ID NO 167
<211> LENGTH: 11
<212> TYPE: PRT
<213> ORGANISM: Artificial sequence
<220> FEATURE:
<223> OTHER INFORMATION: TAA

<400> SEQUENCE: 167

Phe Leu Met Lys Asn Ser Asp Leu Tyr Gly Ala
1               5                   10

<210> SEQ ID NO 168
<211> LENGTH: 10
<212> TYPE: PRT
<213> ORGANISM: Artificial sequence
<220> FEATURE:
<223> OTHER INFORMATION: TAA

<400> SEQUENCE: 168

Lys Leu Ile Asp His Gln Gly Leu Tyr Leu
1               5                   10

<210> SEQ ID NO 169
<211> LENGTH: 12
<212> TYPE: PRT
<213> ORGANISM: Artificial sequence
<220> FEATURE:
<223> OTHER INFORMATION: TAA

<400> SEQUENCE: 169

Gly Pro Gly Ile Phe Pro Pro Pro Pro Gln Pro
1               5                   10

<210> SEQ ID NO 170
<211> LENGTH: 9
<212> TYPE: PRT
<213> ORGANISM: Artificial sequence
<220> FEATURE:
<223> OTHER INFORMATION: TAA

<400> SEQUENCE: 170

Ala Leu Asn Glu Ser Leu Val Glu Cys
1               5

<210> SEQ ID NO 171
<211> LENGTH: 9
<212> TYPE: PRT
<213> ORGANISM: Artificial sequence
<220> FEATURE:
<223> OTHER INFORMATION: TAA

<400> SEQUENCE: 171

Gly Leu Ala Ala Leu Ala Val His Leu
1               5

<210> SEQ ID NO 172
<211> LENGTH: 9
<212> TYPE: PRT
<213> ORGANISM: Artificial sequence
<220> FEATURE:
<223> OTHER INFORMATION: TAA

<400> SEQUENCE: 172

Leu Leu Leu Glu Ala Val Trp His Leu
1               5

<210> SEQ ID NO 173
```

```
<211> LENGTH: 9
<212> TYPE: PRT
<213> ORGANISM: Artificial sequence
<220> FEATURE:
<223> OTHER INFORMATION: TAA

<400> SEQUENCE: 173

Ser Ile Ile Glu Tyr Leu Pro Thr Leu
1               5

<210> SEQ ID NO 174
<211> LENGTH: 9
<212> TYPE: PRT
<213> ORGANISM: Artificial sequence
<220> FEATURE:
<223> OTHER INFORMATION: TAA

<400> SEQUENCE: 174

Thr Leu His Asp Gln Val His Leu Leu
1               5

<210> SEQ ID NO 175
<211> LENGTH: 9
<212> TYPE: PRT
<213> ORGANISM: Artificial sequence
<220> FEATURE:
<223> OTHER INFORMATION: TAA

<400> SEQUENCE: 175

Ser Leu Leu Met Trp Ile Thr Gln Cys
1               5

<210> SEQ ID NO 176
<211> LENGTH: 11
<212> TYPE: PRT
<213> ORGANISM: Artificial sequence
<220> FEATURE:
<223> OTHER INFORMATION: TAA

<400> SEQUENCE: 176

Phe Leu Leu Asp Lys Pro Gln Asp Leu Ser Ile
1               5                   10

<210> SEQ ID NO 177
<211> LENGTH: 10
<212> TYPE: PRT
<213> ORGANISM: Artificial sequence
<220> FEATURE:
<223> OTHER INFORMATION: TAA

<400> SEQUENCE: 177

Tyr Leu Leu Asp Met Pro Leu Trp Tyr Leu
1               5                   10

<210> SEQ ID NO 178
<211> LENGTH: 9
<212> TYPE: PRT
<213> ORGANISM: Artificial sequence
<220> FEATURE:
<223> OTHER INFORMATION: TAA

<400> SEQUENCE: 178

Gly Leu Leu Asp Cys Pro Ile Phe Leu
1               5

<210> SEQ ID NO 179
<211> LENGTH: 9
```

<212> TYPE: PRT
<213> ORGANISM: Artificial sequence
<220> FEATURE:
<223> OTHER INFORMATION: TAA

<400> SEQUENCE: 179

Val Leu Ile Glu Tyr Asn Phe Ser Ile
1               5

<210> SEQ ID NO 180
<211> LENGTH: 11
<212> TYPE: PRT
<213> ORGANISM: Artificial sequence
<220> FEATURE:
<223> OTHER INFORMATION: TAA

<400> SEQUENCE: 180

Thr Leu Tyr Asn Pro Glu Arg Thr Ile Thr Val
1               5                   10

<210> SEQ ID NO 181
<211> LENGTH: 9
<212> TYPE: PRT
<213> ORGANISM: Artificial sequence
<220> FEATURE:
<223> OTHER INFORMATION: TAA

<400> SEQUENCE: 181

Ala Val Pro Pro Pro Pro Ser Ser Val
1               5

<210> SEQ ID NO 182
<211> LENGTH: 9
<212> TYPE: PRT
<213> ORGANISM: Artificial sequence
<220> FEATURE:
<223> OTHER INFORMATION: TAA

<400> SEQUENCE: 182

Lys Leu Gln Glu Glu Leu Asn Lys Val
1               5

<210> SEQ ID NO 183
<211> LENGTH: 11
<212> TYPE: PRT
<213> ORGANISM: Artificial sequence
<220> FEATURE:
<223> OTHER INFORMATION: TAA

<400> SEQUENCE: 183

Lys Leu Met Asp Pro Gly Ser Leu Pro Pro Leu
1               5                   10

<210> SEQ ID NO 184
<211> LENGTH: 9
<212> TYPE: PRT
<213> ORGANISM: Artificial sequence
<220> FEATURE:
<223> OTHER INFORMATION: TAA

<400> SEQUENCE: 184

Ala Leu Ile Val Ser Leu Pro Tyr Leu
1               5

<210> SEQ ID NO 185
<211> LENGTH: 9
<212> TYPE: PRT

```
<213> ORGANISM: Artificial sequence
<220> FEATURE:
<223> OTHER INFORMATION: TAA

<400> SEQUENCE: 185

Phe Leu Leu Asp Gly Ser Ala Asn Val
1               5

<210> SEQ ID NO 186
<211> LENGTH: 10
<212> TYPE: PRT
<213> ORGANISM: Artificial sequence
<220> FEATURE:
<223> OTHER INFORMATION: TAA

<400> SEQUENCE: 186

Ala Leu Asp Pro Ser Gly Asn Gln Leu Ile
1               5                   10

<210> SEQ ID NO 187
<211> LENGTH: 9
<212> TYPE: PRT
<213> ORGANISM: Artificial sequence
<220> FEATURE:
<223> OTHER INFORMATION: TAA

<400> SEQUENCE: 187

Ile Leu Ile Lys His Leu Val Lys Val
1               5

<210> SEQ ID NO 188
<211> LENGTH: 9
<212> TYPE: PRT
<213> ORGANISM: Artificial sequence
<220> FEATURE:
<223> OTHER INFORMATION: TAA

<400> SEQUENCE: 188

Val Leu Leu Asp Thr Ile Leu Gln Leu
1               5

<210> SEQ ID NO 189
<211> LENGTH: 9
<212> TYPE: PRT
<213> ORGANISM: Artificial sequence
<220> FEATURE:
<223> OTHER INFORMATION: TAA

<400> SEQUENCE: 189

His Leu Ile Ala Glu Ile His Thr Ala
1               5

<210> SEQ ID NO 190
<211> LENGTH: 9
<212> TYPE: PRT
<213> ORGANISM: Artificial sequence
<220> FEATURE:
<223> OTHER INFORMATION: TAA

<400> SEQUENCE: 190

Ser Met Asn Gly Gly Val Phe Ala Val
1               5

<210> SEQ ID NO 191
<211> LENGTH: 9
<212> TYPE: PRT
<213> ORGANISM: Artificial sequence
```

```
<220> FEATURE:
<223> OTHER INFORMATION: TAA

<400> SEQUENCE: 191

Met Leu Ala Glu Lys Leu Leu Gln Ala
1               5

<210> SEQ ID NO 192
<211> LENGTH: 9
<212> TYPE: PRT
<213> ORGANISM: Artificial sequence
<220> FEATURE:
<223> OTHER INFORMATION: TAA

<400> SEQUENCE: 192

Tyr Met Leu Asp Ile Phe His Glu Val
1               5

<210> SEQ ID NO 193
<211> LENGTH: 11
<212> TYPE: PRT
<213> ORGANISM: Artificial sequence
<220> FEATURE:
<223> OTHER INFORMATION: TAA

<400> SEQUENCE: 193

Ala Leu Trp Leu Pro Thr Asp Ser Ala Thr Val
1               5                   10

<210> SEQ ID NO 194
<211> LENGTH: 9
<212> TYPE: PRT
<213> ORGANISM: Artificial sequence
<220> FEATURE:
<223> OTHER INFORMATION: TAA

<400> SEQUENCE: 194

Gly Leu Ala Ser Arg Ile Leu Asp Ala
1               5

<210> SEQ ID NO 195
<211> LENGTH: 9
<212> TYPE: PRT
<213> ORGANISM: Artificial sequence
<220> FEATURE:
<223> OTHER INFORMATION: TAA

<400> SEQUENCE: 195

Ala Leu Ser Val Leu Arg Leu Ala Leu
1               5

<210> SEQ ID NO 196
<211> LENGTH: 9
<212> TYPE: PRT
<213> ORGANISM: Artificial sequence
<220> FEATURE:
<223> OTHER INFORMATION: TAA

<400> SEQUENCE: 196

Ser Tyr Val Lys Val Leu His His Leu
1               5

<210> SEQ ID NO 197
<211> LENGTH: 9
<212> TYPE: PRT
<213> ORGANISM: Artificial sequence
<220> FEATURE:
```

<223> OTHER INFORMATION: TAA

<400> SEQUENCE: 197

Val Tyr Leu Pro Lys Ile Pro Ser Trp
1               5

<210> SEQ ID NO 198
<211> LENGTH: 9
<212> TYPE: PRT
<213> ORGANISM: Artificial sequence
<220> FEATURE:
<223> OTHER INFORMATION: TAA

<400> SEQUENCE: 198

Asn Tyr Glu Asp His Phe Pro Leu Leu
1               5

<210> SEQ ID NO 199
<211> LENGTH: 9
<212> TYPE: PRT
<213> ORGANISM: Artificial sequence
<220> FEATURE:
<223> OTHER INFORMATION: TAA

<400> SEQUENCE: 199

Val Tyr Ile Ala Glu Leu Glu Lys Ile
1               5

<210> SEQ ID NO 200
<211> LENGTH: 12
<212> TYPE: PRT
<213> ORGANISM: Artificial sequence
<220> FEATURE:
<223> OTHER INFORMATION: TAA

<400> SEQUENCE: 200

Val His Phe Glu Asp Thr Gly Lys Thr Leu Leu Phe
1               5                   10

<210> SEQ ID NO 201
<211> LENGTH: 9
<212> TYPE: PRT
<213> ORGANISM: Artificial sequence
<220> FEATURE:
<223> OTHER INFORMATION: TAA

<400> SEQUENCE: 201

Val Leu Ser Pro Phe Ile Leu Thr Leu
1               5

<210> SEQ ID NO 202
<211> LENGTH: 9
<212> TYPE: PRT
<213> ORGANISM: Artificial sequence
<220> FEATURE:
<223> OTHER INFORMATION: TAA

<400> SEQUENCE: 202

His Leu Leu Glu Gly Ser Val Gly Val
1               5

<210> SEQ ID NO 203
<211> LENGTH: 9
<212> TYPE: PRT
<213> ORGANISM: Artificial sequence
<220> FEATURE:
<223> OTHER INFORMATION: PRAME-004

```
<400> SEQUENCE: 203

Ser Leu Leu Gln His Leu Ile Gly Leu
1               5

<210> SEQ ID NO 204
<211> LENGTH: 9
<212> TYPE: PRT
<213> ORGANISM: Artificial sequence
<220> FEATURE:
<223> OTHER INFORMATION: MAG-003

<400> SEQUENCE: 204

Lys Val Leu Glu His Val Val Arg Val
1               5
```

METHOD FOR THE CHARACTERIZATION OF PEPTIDE:MHC BINDING POLYPEPTIDES

CROSS-REFERENCE TO RELATED APPLICATIONS

This application is a non-provisional U.S. patent application which claims priority to U.S. Provisional Application No. 62/886,225, filed 13 Aug. 2019, as well as German Patent Application No. 10 2019 121 834.9, filed 13 Aug. 2019. The disclosures of the priority applications are incorporated in their entirety herein by reference.

REFERENCE TO SEQUENCE LISTING SUBMITTED AS A COMPLIANT ASCII TEXT FILE (.TXT)

Pursuant to the EFS-Web legal framework and 37 CFR §§ 1.821-825 (see MPEP § 2442.03(a)), a Sequence Listing in the form of an ASCII-compliant text file (entitled "Sequence_Listing_2912919-103001_ST25.txt" created on 10 Aug. 2020, and 36,380 bytes in size) is submitted concurrently with the instant application, and the entire contents of the Sequence Listing are incorporated herein by reference.

BACKGROUND

1. Field

The present invention relates to a method for the characterization of peptide:MHC binding polypeptides, e.g. by mass spectrometry and an analysis of the recognized peptide space, i.e. in order to identify peptides that can be bound in the context of their presentation by MHC, and those who cannot be bound.

2. Description of Related Art

Immunotherapy has obtained a prominent role in the field of oncology and has proven valuable in the treatment of different types of tumors. A range of immunotherapies varies from chimeric antigen receptors (CARs), expanding tumor-infiltrating lymphocytes (TILs) and T-cell receptor (TCR)-transduced effector cells. Various studies successfully make use of TCR-engineered T-cells to enhance patients' adaptive immune responses against malignancies, demonstrating potent anti-tumor reactivity. The efficacy of genetically modified T-cells against cancer is greatly improved at the expense of enhanced toxicities, however.

Off-target toxicity occurs when a transduced T-cell population unexpectedly attacks an antigen other than the intended one or activates themselves independently from their specificity.

US 2018/0125889 indicates that a gamma delta T-cell may be engineered to express an inhibitory CAR, which minimizes activation in off-target cells, e.g. non tumor cells, in which the cell surface target is a tumor-associated, but not tumor-specific antigen. WO 2018/053374 describes a T-cell epitope screening method to predict or study the toxicity and/or off-target effects of T-cells, TCRs, or TCR-like molecules, including contacting an engineered target cell, or a population of engineered target cells, with a T-cell, a TCR, or a TCR-like molecule, and performing an assay to determine whether the T-cell, TCR, or a TCR-like molecule binds to the engineered target cell, or population of engineered target cells, and/or to measure the strength of any such binding.

Bijen et al. (Bijen et al., 2018) found off-target recognition by the 7B5 T-cell clone of human fibroblasts and keratinocytes that are not expressing the HA-2 antigen. Bijen et al. discloses a combinatorial peptide library scanning approach to identify an off-target peptide, i.e., CDH13-derived peptide, recognized by the 7B5 T-cell clone.

There remains a need to reduce the off-target toxicity in immunotherapy.

There are two classes of MHC molecules. MHC I or II that can be found on most nucleated cells. MHC molecules are composed of an alpha heavy chain and beta-2-microglobulin (MHC class I receptors) or an alpha and a beta chain (MHC class II receptors), respectively. Their three-dimensional conformation results in a binding groove, which allows for a non-covalent interaction with specific peptides.

MHC class I receptors present peptides that result from proteolytic cleavage of predominantly endogenous proteins, defective ribosomal particles (DRIPs) and larger peptides. MHC class II receptors can be found predominantly on professional antigen presenting cells (APCs), and primarily present peptides of exogenous or transmembrane proteins that are taken up by APCs during the course of endocytosis and are subsequently processed.

Complexes of peptide and MHC class I molecules are recognized by CD8-positive cytotoxic T-lymphocytes bearing the appropriate T-cell receptor (TCR), whereas complexes of peptide and MHC class II molecules are recognized by CD4-positive helper-T cells bearing the appropriate TCR. During this recognition process, it is well known that the TCR, the peptide and the MHC are present and form a complex in a stoichiometric amount of 1:1:1.

For a peptide to trigger (elicit) a cellular immune response, it must bind to an MHC-molecule. This process is dependent on the allele of the MHC-molecule and specific polymorphisms of the amino acid sequence of the peptide. MHC-class-1-binding peptides are usually 8-12 amino acids in length and usually contain at least two conserved residues ("anchors") in their sequence that interact with the corresponding binding groove of the MHC-molecule. In this way, each MHC allele has a binding motif that controls the peptides' ability to specifically bind to the binding groove. Nevertheless, as mentioned above, in the MHC class I dependent immune reaction, peptides not only have to be able to bind to certain MHC class I molecules being expressed by tumor cells, they also have to be recognized by T-cells bearing specific T-cell receptors (TCRs). The antigens that are recognized by the tumor specific cytotoxic T-lymphocytes, that is, their epitopes, can be molecules (peptides) derived from all protein classes, such as enzymes, receptors, transcription factors, etc. which are expressed and, as compared to unaltered cells of the same origin, up-regulated in cells of the respective tumor.

Many cancer immunotherapies that are currently in development rely on the administration of peptide:MHC binding polypeptides to a subject in the form of a soluble polypeptide molecule or a transfer of cells, preferentially T-cells, expressing such polypeptides as membrane bound molecules.

While the actual target peptide sequence for such peptide:MHC binding polypeptides is usually established/defined, there may be an unknown number of additional peptides that these molecules can bind to. These so called "off-target peptides" constitute a significant safety risk for the application in vivo, due to potentially serious side-effects. The reason for these side-effects is usually the presentation of such off-target peptides on healthy tissues other than the cancer tissue, and respective fatal outcomes have been reported previously (see, for example (Linette et al., 2013)). There are furthermore case reports of problems and potentially fatal serious adverse events upon administration of T cells transduced with certain non-optimised T-cell receptors (van den Berg J H, et al. Mol Ther. 2015; 23(9): 1541-1550), and with receptors targeting Mage-A4 and Mage-A10 (Adaptimmune products ADP-A2M4 and ADP-A2M10).

Consequently, the precise knowledge about the identity of these off-target peptides as well as their safety relevance is of highest relevance for the proper development of cancer immunotherapies involving peptide:MHC binding polypeptides.

Current strategies to identify such peptides comprise searching of protein sequence databases for peptides with similarity to the target peptide. These approaches usually result in a large number of potentially ten-thousands of peptides, depending on the applied search parameters, all of which need to be tested in downstream assays for their potential to be bound by respective peptide:MHC binding polypeptides. A modification of these searches by integration of additional characteristics from the peptide:MHC binding polypeptide, such as mutational scanning data, can decrease the number of peptides that need to be tested in downstream assays, but still do not provide any information whether these peptides are also presented by MHC molecules in a physiological setting, and therefore still pose a considerable safety risk to the application in vivo.

In addition, all these approaches require certain assumptions on how similarity to the target sequence is evaluated or which amino acids are tolerated in certain positions of the peptide sequence based on mutational scanning data. Peptides that do not fulfill these assumptions, for example because their mode of binding to the MHC molecule or the peptide:MHC binding polypeptide varies from that of the target peptide sequence, cannot be identified by these approaches. This is particularly relevant for peptides with a different length than the target peptide (e.g. nonameric off-target peptide from a decamer target peptide) which may show a completely different amino acid sequence not related to the target sequence (Ekeruche-Makinde et al., 2013).

In view of the above, there is a need in the art for efficient methods of identifying the target epitopes of TCRs with the aim to come as close to the situation in vivo. This furthermore requires the identification of "off-target" epitopes that are cross-reactive with the TCRs (or TCR-like molecules) under analysis, so that therapeutics can be developed that are not only highly specific but that also do not target normal healthy tissue.

BRIEF SUMMARY OF THE INVENTION

It is therefore highly desirable to provide an alternative and more direct and relevant method for the identification of MHC binding peptides that are bound or recognized by a peptide:MHC binding polypeptide by avoiding the use of inaccurate prediction algorithms and cumbersome testing of potentially hundreds to thousands of potential off-target peptides. It is therefore an object of the present invention to provide such a method for the characterization of peptide:MHC binding polypeptides in order to identify the off-target peptides (i.e. MHC presented ligands) that can be bound by these molecules in a comprehensive and direct manner.

Other objects and advantages of the present invention will become readily apparent for the person of skill when studying the following description as provided.

In a first aspect of the present invention, the object of the invention is solved by a method for identifying the binding of a polypeptide molecule, comprising at least one defined peptide binding domain, to a peptide of a peptide:MHC complex, comprising a) providing a sample comprising peptide:MHC complexes to be analyzed, b) contacting said sample with said polypeptide molecule, wherein said molecule is optionally attached to a matrix material, and allowing said at least one peptide binding domain of said polypeptide molecule to bind, preferably specifically, to a peptide:MHC complex, wherein the amino acid sequence of said peptide binding domain is derived from a T cell receptor (TCR), a T-cell receptor-like polypeptide, and/or an antibody binding domain, and optionally, wherein said polypeptide molecule further comprises at least one attachment site binding to or being attached to said matrix material, c) isolating said peptide:MHC complex bound to said at least one peptide binding domain, and d) identifying said peptide of said at least one peptide:MHC complex as isolated in step c), and thereby identifying the binding of said polypeptide molecule to said peptide of said peptide:MHC complex.

In another preferred aspect, the disclosure provides for methods for identifying an off-target peptide of an off-target peptide:MHC complex capable of binding to a defined T-cell receptor (TCR) peptide binding domain, including, for example:

a) providing a sample, e.g. a cellular lysate, comprising an off-target peptide:MHC complex, wherein said sample does not necessarily contain the target peptide:MHC complex defining the peptide binding properties of said peptide binding domain, b) affinity purifying said sample, comprising contacting said sample with a polypeptide, optionally coupled or attached to a matrix material, wherein said polypeptide comprises at least one peptide binding domain binding to said target peptide:MHC complex, and wherein said polypeptide is a T-cell receptor (TCR) and/or an antibody that binds to the target peptide of said target peptide:MHC complex, c) isolating said off-target peptide:MHC complex bound to said at least one peptide binding domain; and d) identifying said off-target peptide of said at least one off-target peptide:MHC complex as isolated in step c).

In the context of the present invention, said sample can be selected from any suitable natural or artificial sample comprising at least one peptide:MHC complex to be analyzed, such as a cellular lysate, or a sample comprising purified or enriched peptide:MHC complex(es). The composition/properties of the peptide:MHC complex(es) as well as the concentration/amount of the molecules can be known or unknown. One example of the sample is a library of peptide:MHC complexes, wherein the sequences of the peptides as bound are defined and/or similar in their length and amino acid sequences.

The peptide:MHC binding polypeptide in this case is, or is derived from, a T-cell receptor (TCR), a T-cell receptor-like polypeptide, and/or an antibody binding domain, or a fragment of these molecules that is able to bind or mediate binding of said molecule to specific/defined peptide:MHC complexes. The at least one peptide binding domain can be a molecule or is derived from a molecule selected from a simultaneous multiple interaction T-cell engaging (SMITE) bispecific, a bispecific T-cell engager (BiTE), an scFV, a diabody, a dual-affinity re-targeting antibody (DART), a tandem antibody (TandAb), a soluble TCR, an scTCR, a mutated TCR, for example comprising S-bridges, a truncated TCR, and a bispecific T-cell receptor (TCR)-antibody fusion molecule.

In the context of the present invention, a "defined" or "defining" a peptide:MHC binding polypeptide shall mean a polypeptide (constituting or comprising a binding domain) that binds to a selected ("targeted") MHC peptide in the context of MHC. In a preferred embodiment, said binding of the peptide:MHC binding polypeptide to the selected MHC peptide takes place with the highest affinity and/or selectivity, when compared to other (known) MHC peptides.

In an aspect, peptide:MHC binding polypeptides may bind to tumor-associated antigens (TAA):MHC complexes.

"Tumor-associated antigens (TAA) peptides" refer to as "TAA peptides" herein denotes peptides which have been isolated and identified from tumorous material and which underwent antigen processing in a tumor cell and can thus be recognized by immune effector cells of the host. The TAA peptides comprises or consists of 10, 12 or 14, such as 8 to 14, 8 to 12, for example 9 to 11 amino acids. The TAA peptides in context of the present invention may be for example a cancer/testis (CT) antigenic peptide. Examples of cancer/testis (CT) antigenic peptides are the MAGE-A antigenic peptide of the amino acid sequence of SEQ ID NO: 10 and the PRAME antigenic peptide of the amino acid sequence of SEQ ID NO: 9. The TAA peptide in context of the present invention comprises a T-cell epitope and may also be referred to as TAA peptide, in a general context, and as TAA peptide C in context of the present invention when it is referred to one specific TAA peptide.

In an aspect, tumor associated antigen (TAA) peptides that are capable of use with methods and embodiments described herein include, for example, those TAA peptides described in U.S. Publication 20160187351, U.S. Publication 20170165335, U.S. Publication 20170035807, U.S. Publication 20160280759, U.S. Publication 20160287687, U.S. Publication 20160346371, U.S. Publication 20160368965, U.S. Publication 20170022251, U.S. Publication 20170002055, U.S. Publication 20170029486, U.S. Publication 20170037089, U.S. Publication 20170136108, U.S. Publication 20170101473, U.S. Publication 20170096461, U.S. Publication 20170165337, U.S. Publication 20170189505, U.S. Publication 20170173132, U.S. Publication 20170296640, U.S. Publication 20170253633, U.S. Publication 20170260249, U.S. Publication 20180051080, and U.S. Publication No. 20180164315, the contents of each of these publications and sequence listings described therein are herein incorporated by reference in their entireties.

In an aspect, the bispecific antigen binding proteins described herein, in particular the antigen binding site B in context of the present invention, selectively recognize cells which present a TAA peptide described in one of more of the patents and publications described above. In another aspect, TAA that are capable of use with the methods and embodiments described herein include at least one TAA consisting of an amino acid sequence selected from the amino acid sequences of SEQ ID NO: 52 to 65, 67 to 96, 98 to 110, SEQ ID NO: 172 to 182, 184 to 268, SEQ ID NO: 9 and 10, preferably SEQ ID NO: 9 and 10. In an aspect, the bispecific antigen binding proteins, in particular the antigen binding site B of the bispecific antigen binding proteins, selectively recognize cells which present a TAA peptide/MHC complex, wherein the TAA peptide comprises or consist of an amino acid sequence of SEQ ID NO: 52 to 65, 67 to 96, 98, SEQ ID NO: 172 to 182, 184 to 268, SEQ ID NO: 9 and 10, or any of the amino acid sequences described in the patents or applications described herein, preferably SEQ ID NO: 9 and 10.

TABLE A

List of TAAs

| SEQ ID NO: | Amino Acid Sequence |
|---|---|
| 47 | YLYDSETKNA |
| 48 | HLMDQPLSV |
| 49 | GLLKKINSV |
| 50 | FLVDGSSAL |
| 51 | FLFDGSANLV |
| 52 | FLYKIIDEL |
| 53 | FILDSAETTTL |
| 54 | SVDVSPPKV |
| 55 | VADKIHSV |
| 56 | IVDDLTINL |
| 57 | GLLEELVTV |
| 58 | TLDGAAVNQV |
| 59 | SVLEKEIYSI |
| 60 | LLDPKTIFL |
| 62 | YLMDDFSSL |
| 63 | KVWSDVTPL |
| 64 | LLWGHPRVALA |
| 65 | KIWEELSVLEV |
| 66 | LLIPFTIFM |
| 67 | FLIENLLAA |
| 68 | LLWGHPRVALA |
| 69 | FLLEREQLL |
| 70 | SLAETIFIV |
| 71 | TLLEGISRA |
| 72 | ILQDGQFLV |
| 73 | VIFEGEPMYL |
| 74 | SLFESLEYL |
| 75 | SLLNQPKAV |
| 76 | GLAEFQENV |
| 77 | KLLAVIHEL |
| 78 | TLHDQVHLL |
| 79 | TLYNPERTITV |
| 80 | KLQEKIQEL |

TABLE A-continued

List of TAAs

| SEQ ID NO: | Amino Acid Sequence |
|---|---|
| 81 | SVLEKEIYSI |
| 82 | RVIDDSLWGV |
| 83 | VLFGELPAL |
| 84 | GLVDIMVHL |
| 85 | FLNAIETAL |
| 86 | ALLQALMEL |
| 87 | ALSSSQAEV |
| 88 | SLITGQDLLSV |
| 89 | QLIEKNWLL |
| 90 | LLDPKTIFL |
| 91 | RLHDENILL |
| 93 | GLPSATTTV |
| 94 | GLLPSAESIKL |
| 95 | KTASINQNV |
| 203 | SLLQHLIGL |
| 96 | YLMDDFSSL |
| 97 | LMYPYIYHV |
| 98 | KVWSDVTPL |
| 99 | LLWGHPRVALA |
| 100 | VLDGKVAVV |
| 101 | GLLGKVTSV |
| 102 | KMISAIPTL |
| 103 | GLLETTGLLAT |
| 104 | TLNTLDINL |
| 105 | VIIKGLEEI |
| 106 | YLEDGFAYV |
| 107 | KIWEELSVLEV |
| 108 | LLIPFTIFM |
| 109 | ISLDEVAVSL |
| 110 | KISDFGLATV |
| 111 | KLIGNIHGNEV |
| 112 | ILLSVLHQL |
| 113 | LDSEALLTL |
| 114 | VLQENSSDYQSNL |
| 115 | HLLGEGAFAQV |
| 116 | SLVENIHVL |
| 118 | SLSEKSPEV |
| 119 | AMFPDTIPRV |
| 120 | FLIENLLAA |
| 121 | FTAEFLEKV |
| 122 | ALYGNVQQV |
| 123 | LFQSRIAGV |
| 124 | ILAEEPIYIRV |
| 125 | FLLEREQLL |
| 126 | LLLPLELSLA |
| 127 | SLAETIFIV |
| 128 | AILNVDEKNQV |
| 129 | RLFEEVLGV |
| 130 | YLDEVAFML |
| 131 | KLIDEDEPLFL |
| 132 | KLFEKSTGL |
| 133 | SLLEVNEASSV |
| 134 | GVYDGREHTV |
| 135 | GLYPVTLVGV |
| 136 | ALLSSVAEA |
| 137 | TLLEGISRA |
| 138 | SLIEESEEL |
| 139 | ALYVQAPTV |
| 140 | KLIYKDLVSV |
| 141 | ILQDGQFLV |
| 142 | SLLDYEVSI |
| 143 | LLGDSSFFL |
| 144 | VIFEGEPMYL |
| 145 | ALSYILPYL |
| 146 | FLFVDPELV |
| 147 | SEWGSPHAAVP |
| 148 | ALSELERVL |
| 149 | SLFESLEYL |
| 150 | KVLEYVIKV |
| 151 | VLLNEILEQV |
| 152 | SLLNQPKAV |
| 153 | KMSELQTYV |
| 154 | ALLEQTGDMSL |
| 155 | VIIKGLEEITV |
| 156 | KQFEGIVEI |

TABLE A-continued

List of TAAs

| SEQ ID NO: | Amino Acid Sequence |
|---|---|
| 157 | KLQEEIPVL |
| 158 | GLAEFQENV |
| 159 | NVAEIVIHI |
| 160 | ALAGIVTNV |
| 161 | NLLIDDKGTIKL |
| 162 | VLMQDSRLYL |
| 204 | KVLEHVVRV |
| 163 | LLWGNLPEI |
| 164 | SLMEKNQSL |
| 165 | KLLAVIHEL |
| 166 | ALGDKFLLRV |
| 167 | FLMKNSDLYGA |
| 168 | KLIDHQGLYL |
| 169 | GPGIFPPPPPQP |
| 170 | ALNESLVEC |
| 171 | GLAALAVHL |
| 172 | LLLEAVWHL |
| 173 | SIIEYLPTL |
| 174 | TLHDQVHLL |
| 175 | SLLMWITQC |
| 176 | FLLDKPQDLSI |
| 177 | YLLDMPLWYL |
| 178 | GLLDCPIFL |
| 179 | VLIEYNFSI |
| 180 | TLYNPERTITV |
| 181 | AVPPPPSSV |
| 182 | KLQEELNKV |
| 183 | KLMDPGSLPPL |
| 184 | ALIVSLPYL |
| 185 | FLLDGSANV |
| 186 | ALDPSGNQLI |
| 187 | ILIKHLVKV |
| 188 | VLLDTILQL |
| 189 | HLIAEIHTA |
| 190 | SMNGGVFAV |
| 191 | MLAEKLLQA |
| 192 | YMLDIFHEV |
| 193 | ALWLPTDSATV |
| 194 | GLASRILDA |
| 195 | ALSVLRLAL |
| 196 | SYVKVLHHL |
| 197 | VYLPKIPSW |
| 198 | NYEDHFPLL |
| 199 | VYIAELEKI |
| 200 | VHFEDTGKTLLF |
| 201 | VLSPFILTL |
| 202 | HLLEGSVGV |

Examples as used in the context of the present invention are the defined peptide:MHC binding polypeptide of example 1, showing an affinity to the PRAME-004 peptide SLLQHLIGL (SEQ ID NO: 1), and the defined peptide:MHC binding polypeptide of example 2, which shows an enhanced affinity to the MAGEA4/A8 derived peptide having the sequence KVLEHVVRV (SEQ ID NO. 24), herein also referred to as MAGA4/8 peptide.

A binding of the defined peptide:MHC binding polypeptide may comprise binding to the targeted peptide in the context of MHC or binding to both the targeted peptide and the MHC polypeptide.

While some methods for screening TCRs and TCR-like molecules against peptide ligands have been described in recent years, to date such methods have met with limited success. For example, Birnbaum et al. developed a peptide:MHC ("pMHC") yeast display library of ~2.1×10$^8$ antigen minigenes (Birnbaum et al, 2014). Using Birnbaum's system, cells that bound to soluble TCRs were purified with magnetic beads and then subject to high throughput sequencing. After four rounds of selection, hundreds of peptides were identified that were cross-reactive with five distinct mouse TCRs. However, the original epitopes, to which the TCR was known to bind, were not detected.

The invention preferably uses peptide:MHC binding polypeptides to isolate or enrich specific peptide:MHC molecules from a mixture of organic molecules, like peptides and proteins (e.g. protein lysates produced from tissues or cell lines, libraries of recombinantly produced peptide:MHC molecules) and, e.g. subsequent mass spectrometry to analyze the isolated peptide:MHC molecules and to identify the sequence of bound peptides.

The present method has a number of advantages compared with methods of the state of the art, which can be designated as "off-target prediction approaches".

For the actual identification of off-target binders, in the prediction approaches a binder motif is used to predict a large list of peptides, followed by laborious in vitro testings. In the present invention, a direct identification from samples, like cellular lysates, is possible. This does not require cumbersome testing of predicted peptides in in vitro assays. Furthermore, it was found that the method is highly sensitive, so that even weakly cross-recognized peptides can be identified.

In the prediction approaches, the identification of the source of unknown off-target recognitions is not possible. In contrast, with the present invention, this is possible by creating a sample, e.g. lysate, and using said lysate in affinity chromatography experiments with the peptide:MHC binding polypeptide.

In the prediction approaches, the binder motif generation is inferred from positional scanning data, whereas in the present invention it is inferred from identified off-targets, and further considers multiple substitutions at different positions in the peptide(s) amino acid sequence, without prior in vitro testing necessary.

Finally, with respect to length variants and modifications of the peptide sequences, in the prediction assay no prediction of length variants or naturally occurring peptide modifications is possible, the present assay allows a direct identification of all length variants and naturally occurring peptide modifications such as, for example, phosphorylations, and glycosylations.

In one embodiment, the present method specifically and reliably identifies peptides bound by peptide:MHC binding polypeptides, comprising an enrichment or isolation of peptide:MHC molecules recognized by said peptide:MHC binding polypeptides from mixtures of peptide:MHC molecules derived from biological samples or biotechnological production, and the identification of the enriched/isolated peptide:MHC molecules, e.g. by mass spectrometry, and a subsequent testing of identified peptides for their potential to be bound by the same peptide:MHC binding polypeptides in vitro.

Preferred is a method according to the present invention, wherein said polypeptide molecule comprising said at least one peptide binding domain binding to a peptide:MHC complex is selected from bispecific, trispecific, tetraspecific or multispecific molecules.

Further preferred is a method according to the present invention, wherein said polypeptide molecule comprising said at least one peptide binding domain binding to a peptide:MHC complex is a bispecific molecule comprising a binding domain that is derived from a T cell-receptor (TCR).

In another aspect, the polypeptide containing said at least one peptide binding domain binding to the target peptide:MHC complex may be bispecific molecules comprising a binding domain that is derived from a T cell-receptor (TCR).

In other aspects, methods as described herein may further include selecting a set of polypeptides that differ in their binding properties.

Advantageously, methods as described herein do not require determination of binding motifs by substitution of single amino acids at individual positions of the target peptide, subsequent testing the recognition of these peptide variants in functional assays, then predicting potential off-targets based on said binding motifs employing human proteome databases and subsequently testing these (potentially) large numbers of peptides in in vitro assays, as explained above.

In another aspect, methods as described herein preferably reduce the number of identified off-target peptides by at least 2-fold, preferably at least 5-fold, and most preferred at least 10-fold, as compared to prediction-based approaches by focusing on the relevant peptides which are presented on a biological sample by the appropriate HLA allotype as explained above and in the comparative examples herein.

In another aspect, the at least one binding domain may contain a detectable marker or a label.

In another aspect, methods described herein may further include analyzing said identifying and/or off-target peptide binding using a computer processor.

The present invention may also relate to a kit containing materials for performing the method including a) a material, such as a matrix material described herein, and b) a polypeptide containing at least one binding domain binding to a target peptide:MHC complex.

The present invention further relates to a method of manufacturing a cell population expressing a target specific antigen recognizing construct, including providing a host cell, providing the target specific antigen recognizing construct comprising a coding sequence encoding the second polypeptide, introducing into said host cell said target specific antigen recognizing construct, and expressing said target specific antigen recognizing construct by the host cell. In another aspect, the expressing may include presenting the antigen recognizing construct on the cell surface.

In another aspect, the target specific antigen recognizing construct may be an expression construct containing a promoter sequence operably linked to said coding sequence. In yet another aspect, the target specific antigen recognizing construct may be of mammalian origin, optionally of human origin. The target specific antigen recognizing construct may further be a modified TCR, wherein said modification comprises addition of a functional domain comprising a label, or an alternative domain comprising a membrane anchor domain.

In another aspect, the target specific antigen recognizing construct may be an alpha/beta TCR, gamma/delta TCR, or a single chain TCR (scTCR). In another aspect, the target specific antigen recognizing construct may be introduced into said suitable host cell by retroviral transduction. In yet another aspect, the methods described herein may further include isolating and purifying the target specific antigen recognizing construct from the host cell and, optionally, reconstitution of the target specific antigen recognizing construct in a T-cell.

In an aspect, the present invention relates to a cell, in particular T-cell, population produced by methods of the present invention.

The target specific antigen recognizing constructs, and cells, in particular T-cells, produced by methods of the present invention are expected to show improved properties in a treatment against diseases, wherein said treatment comprises immunotherapy. Because of the fact that the present method resembles a situation closer/more similar to the one in vivo, less off-target effects and side effects will be encountered. This has benefits for medical and clinical uses; in the clinical trial testing a modified anti-MAGE-A3 TCR, derived from immunization of HLA-A*02:01 transgenic mice, two out of nine cancer patients developed fatal on-target neurological toxicity, due to recognition of a peptide derived from the same gene family that is expressed in the brain (Morgan et al., 2013). In another trial, where an affinity-enhanced anti-MAGE-A3 TCR was tested in myeloma and melanoma patients, two patients died of off-target toxicity caused by recognition of a completely different peptide, resulting in severe myocardial damage (Linette et al., 2013; Raman et al., 2016). These clinical cases show how difficult it is to predict the exact specificity and the resulting effects of TCRs that did not undergo optimal thymic selection. It is crucial to develop strategies to extensively validate the exact specificity of TCRs, particularly because TCR-engineered T-cells are highly sensitive (Stone and Kranz, 2013; Jahn et al., 2016).

In another aspect, the present invention relates to a method of treating a patient who has cancer, including administering to the patient a composition comprising the cell population as above, in which the cancer is selected from non-small cell lung cancer (NSCLC), small cell lung cancer (SCLC), renal cell cancer, brain cancer, gastric cancer, colorectal cancer, hepatocellular cancer (HCC), pancreatic cancer, prostate cancer, leukemia, breast cancer, Merkel cell carcinoma, melanoma, ovarian cancer (OC), urinary bladder cancer, uterine cancer, gallbladder and bile duct cancer, esophageal cancer (OSCAR) acute myeloid leukemia, cholangiocellular carcinoma, chronic lymphocytic leukemia, glioblastoma, head and neck squamous cell carcinoma, non-hodgkin lymphoma, and endometrial cancer.

In another aspect, the host cell may be obtained from the patient. In another aspect, the host cell may be obtained from a healthy donor. In another aspect, the host cell may be a CD8+ T cell.

In another aspect, the MHC molecule may be an MHC class I molecule. In another aspect, the MHC molecule may be an HLA-A*02 molecule.

Preferred is a method according to the present invention, wherein said polypeptide molecule comprises at least one second binding domain that is selected from a domain binding to a cell surface molecule known to induce the activation of immune cells, or is selected from the group consisting of immune response-related molecules, CD3, such as the CD3γ, CD3δ, and CD3ε chains, CD4, CD7, CD8, CD10, CD11b, CD11c, CD14, CD16, CD18, CD22, CD25, CD28, CD32a, CD32b, CD33, CD41, CD41b, CD42a, CD42b, CD44, CD45RA, CD49, CD55, CD56, CD61, CD64, CD68, CD94, CD90, CD117, CD123, CD125, CD134, CD137, CD152, CD163, CD193, CD203c, CD235a, CD278, CD279, CD287, Nkp46, NKG2D, GITR, FcεRI, TCRα/β, TCRγ/δ, and HLA-DR.

In another aspect of the method according to the present invention, said attachment site binding to or being attached to said matrix material is positioned in the at least one binding domain, the at least one second domain or is a separate attachment group, and does not interfere, at least not essentially, with the binding of said molecule.

Preferred is a method according to the present invention, wherein the isolation of peptide:MHC molecules is performed by affinity chromatography or immunoprecipitation after coupling of said peptide: MHC binding polypeptide to a solid matrix. Preferred is the method according to the present invention, wherein said matrix material is selected from SEPHAROSE or agarose. Nevertheless, the binding can also be performed in solution without a solid matrix (as a batch), and the complexes can be suitably isolated, e.g. using antibodies, precipitation, filtration or the like.

In another aspect, said method may further comprise contacting said sample in step c) with other binding domain molecules, such as, for example, broad specific TCRs and/or antibodies. Preferably, the isolation in step c) thus may include contacting the peptide:MHC complexes with an antibody against the MHC molecule. In another aspect, the antibody may be at least one selected from W6/32, B1.23.2, BB7.2, GAP-A3, Spv-L3, T039, L243, or IVD-12. Further preferred is a method comprising an isolation of said peptide:MHC molecule in parallel to a broad-specific (or multi-specific or unspecific) peptide:MHC binding polypeptide, which is directed against the MHC component of the peptide:MHC molecule, and therefore allows an isolation of all peptides bound to a certain MHC allotype, irrespective of the nature of the peptide sequence of the bound peptide (FIG. 1). As mentioned, such a broad-specific peptide:MHC binding polypeptide can be, but is not limited to, an antibody, such as the HLA-A*02 pan-specific antibody BB7.2 or the pan-HLA-A,B,C specific antibody W6/32. Additional mouse hybridoma derived antibodies and associated specificities for human MHC molecules are listed in Table 1.

TABLE 1

Overview of commonly applied mouse hybridoma derived antibodies specific for the indicated HLA allotype

| Clone | Specificity | Reference |
| --- | --- | --- |
| W6/32 | HLA-A, B, C | (Barnstable et al., 1978) |
| B1.23.2 | HLA-B, C | (Rebai et al., 1983) |
| BB7.2 | HLA-A*02 | (Parham and Brodsky, 1981) |
| GAP-A3 | HLA-A*03 | (Berger et al., 1982) |
| Spv-L3 | HLA-DQ | (Spits et al., 1983) |
| Tü39 | HLA-DR, DP, DQ | (Maeda and Hirata, 1984) |
| L243 | HLA-DR | (Lampson and Levy, 1980) |
| IVD-12 | HLA-DQ | (Kolstad et al., 1987) |

Combining mass spectrometry data sets of respective isolations performed in parallel yields quantitative data for each identified peptide allowing for a comparison of the isolation efficiency of peptides between different peptide:MHC binding polypeptides or peptide:MHC binding polypeptides and broad specific TCRs or antibodies as illustrated in example 2. This enables a correction for the natural abundance and any unspecific binding of each peptide in the analyzed biological sample by calculation of the fold change/enrichment factor of the peptide:MHC binding polypeptides and the broad specific TCRs or antibodies.

Further preferred is a method comprising the isolation of peptides in such a way that it contains the additional step for the isolation and depletion of non-specifically bound peptides from the mixture of peptide: MHC molecules which bind for example to surfaces of the material utilized in the isolation procedure. Such a step may be constituted by another affinity-chromatography column which contains the solid matrix (e.g., SEPHAROSE, agarose) but without the peptide: MHC binding polypeptide and onto which the mixture of peptide: MHC molecules are applied before the isolation step with the respective peptide: MHC binding polypeptide (see FIG. 1). Subsequent extraction (elution) of these non-specifically bound peptides and identification by mass spectrometry allows for their identification and enables the exclusion of these peptides from further analysis.

Preferred is a method according to the present invention, wherein said identifying in step d) comprises a method selected from mass spectrometry and peptide sequencing. Preferred is a method according to the present invention, further comprising the step of identifying a consensus peptide binding motif for said peptide:MHC complex peptide binding domain. Preferably, a specific peptide binding motif is identified, and/or off target binding motifs are identified.

Further preferred is a method according to the present invention, wherein the identified peptide sequences are used to infer information on the binding characteristics of the peptide:MHC binding polypeptide. Such information can for example be used to generate binding motifs of the peptide: MHC binding polypeptide. These binding motifs are commonly used to describe which positions in the amino acid sequence of the bound peptide are of relevance for the interaction with the peptide:MHC binding polypeptide and moreover which amino acids are tolerated in which position of the peptide sequence while still maintaining binding of the peptide:MHC binding polypeptide. Analysis of the amino acid sequences of the identified peptides and the presence in selected positions of the peptide sequence facilitates the generation of these binding motifs. The latter can be further used to perform predictions of safety relevant off-targets for example from protein sequence databases using the information contained in the binding motif as search criteria.

Preferred is a method according to the present invention wherein the sequence identification is achieved by mass spectrometry in such a way that all peptide sequences contained after the isolation step are identified comprehensively, quantitatively, at the highest sensitivity and with high confidence in the identified sequence match.

In the context of the present invention, one of the techniques and methods listed as follows may be preferably applied:

a) A combination of any number of different mass spectrometry machines and mass spectrometry fragmentation techniques (e.g., collision-induced dissociation (CID), surface-induced dissociation (SID), electron-capture dissociation (ECD), Higher-energy C-trap dissociation (HCD), electron-transfer dissociation (ETD), negative electron-transfer dissociation (NETD), electron-detachment dissociation (EDD), infrared multiphoton dissociation (IRMPD), blackbody infrared radiative dissociation (BIRD), electron-transfer/higher-energy collision dissociation (ETHCD), electron-transfer and collision-induced dissociation (ETCID)) or activation energies to allow for better sequence coverage of the peptide tandem MS (MS/MS) spectra.

b) Mass spectrometry experiments in data-dependent (DDA) as well as data-independent mode (DIA).

c) A pre-separation of peptide mixtures for example by HPLC (e.g. nano-UHPLC run with a gradient of acetonitrile in water) before or directly coupled to the mass spectrometry analysis.

d) Replicate measurements of the same peptide mixture in order to allow a more robust statistical evaluation.

e) A search of MS/MS spectra using different search engines (e.g. MASCOT, SEQUEST, Andromeda, Comet, XTandem, MS-GF+) or software tools using one of these search engines as well as de novo sequence identification algorithms.

f) A search of MS/MS spectra against different protein sequence databases (e.g. UniProtKB, IPI) as well as custom sequence databases generated for specific purposes (e.g. protein sequences translated from mRNA sequences).

g) Mass spectrometry measurements of synthetic versions of the peptides in question to confirm their identity by comparing peptide specific characteristics such as their MS/MS spectra and their retention time for example on an HPLC column.

h) A quantitative assessment of peptide signal areas for example by extraction and integration of MS1 features using appropriate algorithms (e.g. SuperHirn) (Mueller et al., 2007).

Preferred is a method according to the present invention, further comprising the step of identifying the presentation of said peptide motif or peptide motifs on cancerous and/or non-cancerous cells or tissues.

In another important aspect of the method according to the present invention, said method further comprises the step of identifying the cross-reactivity ("off-target binding") for said peptide:MHC complex peptide binding domain. Thus, methods of the invention may further comprise evaluating identified peptides for their relevance to cause off-target toxicity by further investigation applying any of the following techniques, but not limited to:

i) Analysis of gene expression profiles of the source gene of said off-target peptides on different normal or cancer tissues as well as cell lines;

ii) Analysis of peptide presentation profiles of said off-targets on different normal or cancer tissues as well as cell lines; and iii) Analysis of peptide copy numbers per cell of said off-targets on different normal or cancer tissues as well as cell lines In another important aspect of the method according to the present invention, said method further comprises the step of a computational analysis of said identification and/or off target binding, in particular in preparation for further modification(s) of the peptide:MHC binding polypeptides as disclosed herein. Respective programs are well known to the person of skill.

According to the present invention, if off-target peptides are identified by this method, peptide:MHC binding polypeptides can then be suitably altered in order to reduce binding to these off-target peptides. Such alterations comprise modifying the amino acid sequence of the peptide:MHC binding polypeptides, in particular in rounds of maturation, in order to improve the specificity of the peptide:MHC binding polypeptide. Thereby specificity of the newly generated molecules can be greatly improved as exemplary shown by a reduced killing of the target negative cell line T98G in FIG. 2. Methods of a respective maturation of peptide:MHC binding polypeptides are known to the person of skill, and in particular include changes in the peptide:MHC binding domain, such as the six complementary determining regions (CDRs) of the TCR. Similarly, the CDRs of an antibody can be modified accordingly (See, for example Smith et al., 2014, Stewart-Jones et al., 2009; US 2014-0065111A1; WO 2017/174823A1; WO 2016/199141; and WO 2012/013913).

Preferred is then a method according to the present invention wherein said biological sample from which a peptide:MHC mixture is derived, is selected from one to several cancer cell lines, which can be analyzed separately or combined at the isolation step of said method. FIG. 3 illustrates based on XPRESIDENT® data how a combination of several cell lines will increase the coverage of the normal tissue peptide space, which can be addressed directly with this method by selecting several cell lines for sample generation. A skilled person may further want to combine several cell lines with strong MHC expression or modify such cell lines in a way for example by transfection or viral transduction with a gene of interest or treatment with a substance or chemical compound (e.g. Interferon gamma) to increase or modify the MHC expression in such a way as to increase or modify the number of different peptides presented by MHC molecules in such cell lines. These genes could be but are not limited to specific MHC class I or class II genes (e.g. HLA-A*02, HLA-DRB3), genes involved in the MHC peptide processing and presentation (e.g. TAP1/2, LMP7), or transcription factors capable of inducing or modifying gene expression of cells (e.g. AIRE).

Further preferred is a method according to the present invention, wherein said biological sample from which the peptide:MHC mixture is derived is selected from one to several primary normal tissue samples or blood of healthy donors, as well as tumor tissues from cancer patients or infected tissue. Of special relevance are normal tissues or isolated cells derived from these tissues or specific body compartments with a high risk of fatal adverse events in the case of cross-recognition of a peptide on these tissues. Such normal tissues or cells isolated therefrom may be but are not restricted to: brain tissue, heart tissue, blood, lung tissue, spinal cord, nerve tissue or liver tissue.

All biological samples can be fresh or processed (e.g. frozen or prepared), as long as they are still suitable for the method according to the invention. In an aspect, biological samples may include tissues, organs, cells, proteins, or membrane extracts of cells, blood, or biological fluids, such as blood, serum, mucus, urine, ascites fluid or brain fluid obtained from a subject.

Further preferred is a method according to the present invention, wherein said method comprises adding at least one peptide having a known sequence and/or in a preselected (known) amount ("spiking").

In a further preferred aspect of the method according to the present invention, mixtures of peptide:MHC molecules can be generated artificially by biotechnological production. The latter might be achieved but is not restricted to transformation and expression of an MHC molecule in a prokaryotic (e.g. E. coli) system. Such MHC molecules might be further modified to increase their solubility for example by replacing or altering the transmembrane part of such molecules. Peptide loading and reconstitution of such molecules could be achieved but is not limited to refolding of inclusion bodies of MHC components (e.g. protein heavy chain(s) and beta-2 microglobulin) in the presence of the peptide of interest as well as additional chemical substances (glutathione, arginine, etc.) which promote reconstitution of the desired molecule.

A skilled person might want to combine several of these artificially produced peptide:MHC molecules loaded with different peptides to generate a library of tens, to hundreds to thousands to ten-thousands or hundred-thousands of different peptide:MHC molecules, which can be tested with a peptide:MHC binding polypeptide according to the presented method. The skilled person might further want to spike these mixtures of artificially generated peptide:MHC molecules into another mixture of peptide:MHC molecules from a biological source. In another aspect a skilled person could reconstitute these artificially generated peptide:MHC molecules with a peptide containing one or several heavy stable isotope labels, such as but not limited to $^{13}C$, $^{15}N$, or $^{2}H$. These peptide:MHC molecules could then be spiked into another mixture of peptide:MHC molecules for example from a biologic sample to gain additional information of the peptide of interest containing the heavy label and provide quantitative mass spectrometry data on the efficiency of the peptide isolation using the presented method.

The present invention will now be described with reference to the following examples, nevertheless, without being limited thereto. For the purposes of the present invention, all references as cited herein are incorporated by reference in their entireties.

DETAILED DESCRIPTION

Examples

Example 1

The targeted MHC peptide used in this example which is presented in the context of HLA-A*02 is derived from Melanoma antigen preferentially expressed in tumors (PRAME) and shows the sequence SLLQHLIGL ((SEQ ID NO: 1), herein also referred to as PRAME-004).

The peptide:MHC binding polypeptide was exemplified by a modified T-cell receptor molecule which has been engineered to be soluble and showed an enhanced affinity to the PRAME-004 peptide and additionally comprised a CD3-binding antibody moiety.

As a biological source of peptide:MHC mixtures, the human HLA-A*02 high expressing glioblastoma derived cell line T98G was used. This cell line had been previously tested in cytotoxicity experiments with the described peptide:MHC binding polypeptide directed against PRAME-004 and showed positive killing.

Five hundred million T98G cells were subjected to lysis in a CHAPS detergent-containing buffer and homogenized assisted by sonification.

Figure 1:
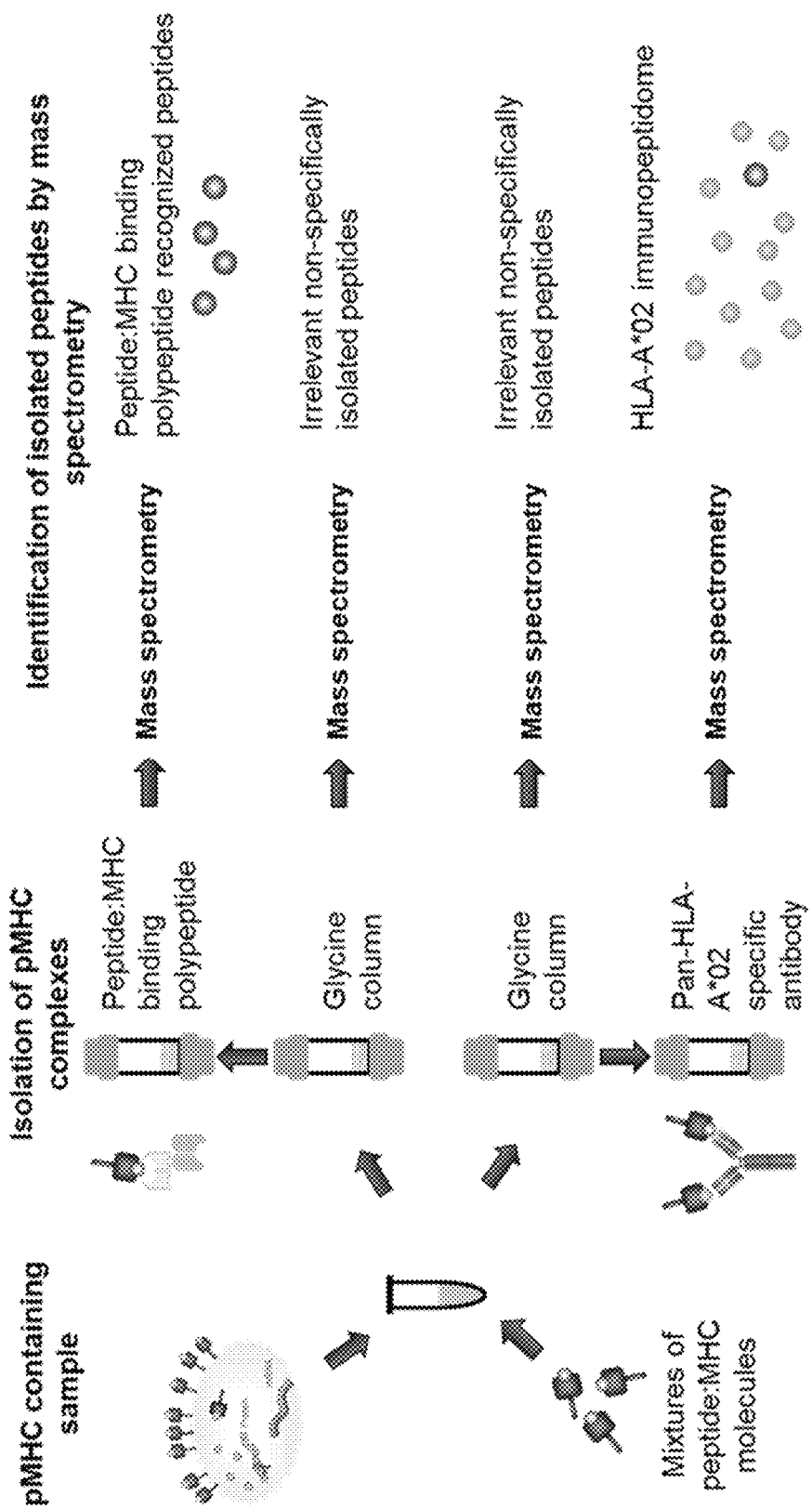
FIG. 1: Schematic overview of the experimental approach according to the present invention. A sample containing peptide:MHC molecules is provided for example by generating a lysate of peptide:MHC expressing cells derived from a tissue or cell line. Alternatively, the sample can be modified by addition of or constituted by mixtures of artificially produced peptide:MHC molecules. Specific peptide:MHC molecules are isolated from this sample for example by contacting it to a matrix, which has a peptide:MHC binding polypeptide attached to it. Glycine columns which do not contain an attached polypeptide maybe used to deplete the sample from non-specifically isolated peptide:MHC molecules, which interact non-specifically with the matrix. Mass spectrometry can be used to identify the MHC bound peptides, which have been isolated from the sample to identify and sequence the peptide space recognized by the peptide:MHC binding polypeptide. Thereby previously unknown off-target risks can be elucidated, without the need of prediction tools. In a modification of this approach the same peptide:MHC molecule containing sample can be split and in parallel be subjected to a second affinity chromatography with HLA broad specific antibodies or TCRs that bind to these molecules irrespective of the bound peptide species. In the illustrated example the HLA-A*02 pan specific antibody BB7.2 is employed to isolate all peptides presented by HLA-A*02 irrespective of the peptide sequence, herein referred to as the HLA-A*02 immunopeptidome. The abundance of interesting (e.g. off-target) peptides in both isolations can be used to assess the binding affinity of the peptide:MHC binding polypeptide for said peptide in comparison to the employed broad specific antibody or TCR, in this example BB7.2.

The peptide:MHC binding polypeptide was coupled to a solid SEPHAROSE matrix at a pre-determined ratio using chemical coupling after BrCN activation. In parallel the same amount of SEPHAROSE was also activated for coupling using the same strategy, yet without addition of the peptide: MHC binding polypeptide. Instead a 0.1 M solution of the amino acid glycine was added to the SEPHAROSE, which instead coupled to the chemically activated groups. The T98G lysate containing the mixture of peptide:MHC molecules was then applied to two affinity chromatography columns loaded with 1 ml of the glycine coupled SEPHAROSE matrix or 1 ml of the SEPHAROSE matrix coupled with the peptide:MHC binding polypeptide. The T98G derived lysate was thereby applied in such a fashion that it would first be run over the glycine coupled SEPHAROSE (referred to herein as glycine column) to remove or deplete any peptides, which would bind non-specifically to the column or the SEPHAROSE matrix before the isolation of peptides which bind to the peptide:MHC binding polypeptide (FIG. 1). After washing of the affinity columns with PBS and ddH$_2$O the bound peptide:MHC complexes were eluted from the columns using Trifluoroacetic acid (TFA).

During this step, MHC bound peptides are also released from the MHC moiety and can be separated from higher molecular weight molecules by ultrafiltration using specified devices with a molecular weight cutoff of less than 10 kDa.

The isolated peptide mixtures were then finally subjected to liquid chromatography coupled mass spectrometry (LC-MS) using a NANOACQUITY UPLC system (Waters) followed by an ORBITRAP fusion™ Tribrid™ mass spectrometer (Thermo Scientific).

Mass spectrometry instruments were operated in data-dependent mode (DDA) utilizing different fragmentation techniques (in this example, CID and HCD fragmentation) as well as MS/MS spectra readout in two different analyzers (in this example, IonTrap and ORBITRAP analyzers).

Peptide fragment spectra were searched against the human proteome using a modified version of the International protein index (IPI v.378) and the Universal protein resource (UniProt) sequence database with the search engine SEQUEST. All peptides eluted and identified from the glycine column were excluded from further analysis as these represent non-specific binding peptides. Furthermore, known contaminants according to in-house databases and algorithms for their identification were removed from the analysis.

In total 20 peptides were identified after isolation and processing which are shown in Table 2. For reference, the target peptide PRAME-004 is shown as well, which has however not been identified among the isolated peptides and was not expected to be identified.

In order to confirm their relevance and analyze the binding strength in comparison to the target peptide, all peptides were subjected to bio-layer interferometry. Measurements were performed on an OCTET RED384 system using settings recommended by the manufacturer. Briefly, binding kinetics were measured at 30° C. and 1000 rpm shake speed using PBS, 0.05% Tween-20, 0.1% BSA as buffer. Peptide:MHC complexes were loaded onto biosensors (HIS1K) prior to analyzing serial dilutions of the peptide:MHC specific binder. The ratio of equilibrium dissociation constants (KD) in comparison to PRAME-004 is presented in the last column of Table 2.

Figure 4:
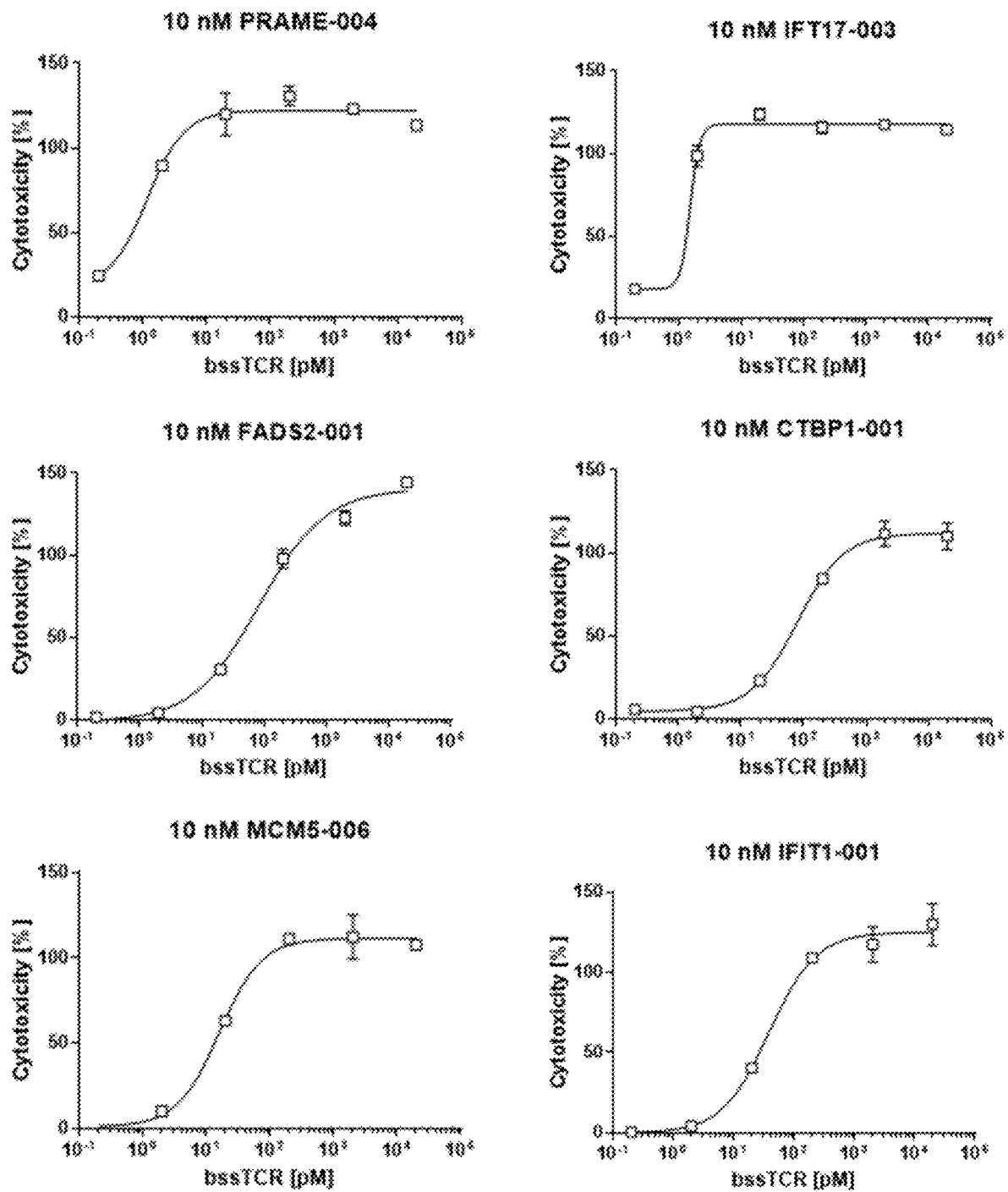
FIG. 4: Cytotoxicity analysis of all peptides identified in the analysis using the PRAME-004 specific peptide:MHC binding polypeptide from Example 1. In brief T2 cell loaded with 10 nM of respective peptides were co-incubated with human CD8+ T-cells in the presence of indicated concentrations of the PRAME-004 specific peptide:MHC binding polypeptide. After 48 h cytotoxicity was quantified by measuring LDH release.
Figure 4:
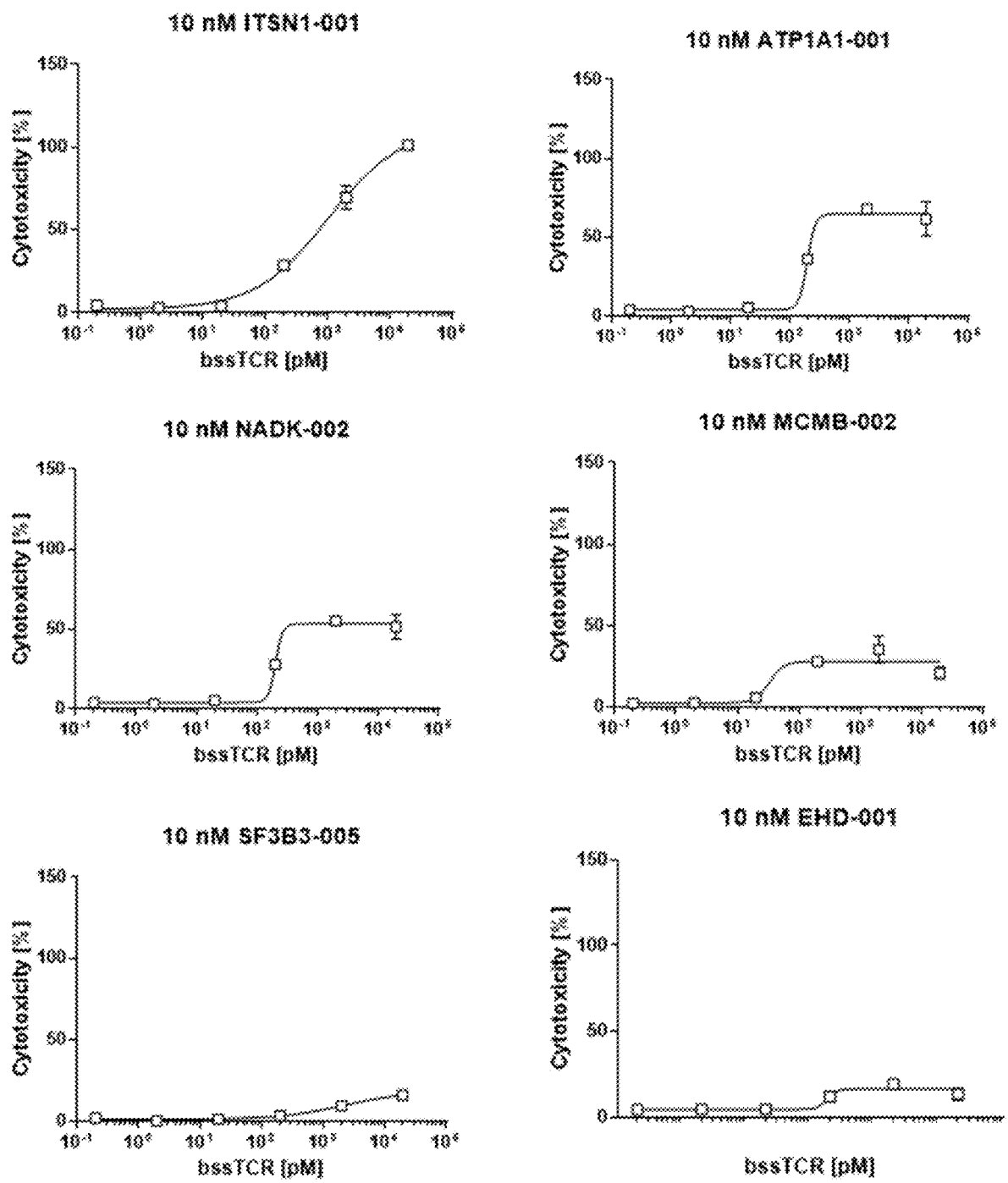
Figure 4:
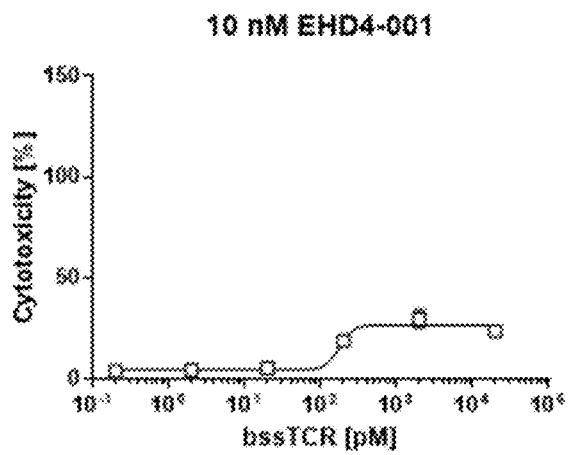

A selection of these peptides was further tested in cytotoxicity experiments. In brief T2 cell (10,000 cells/well) loaded with 10 nM of respective peptides were co-incubated with human CD8+ T cells (50,000 cells/well) in the presence of indicated concentrations of the PRAME-004 specific peptide: MHC binding polypeptide (FIG. 4). After 48 h cytotoxicity was quantified by measuring LDH release using CYTOTOX 96 Non-Radioactive Cytotoxicity Assay Kits (PROMEGA). Corresponding EC50 values of tested peptides are also listed in Table 2. The main off-target emanating from this analysis was IFT17-003 which showed similar KD and EC50 values for the peptide:MHC binding polypeptide as compared to the target peptide PRAME-004.

Figure 5:
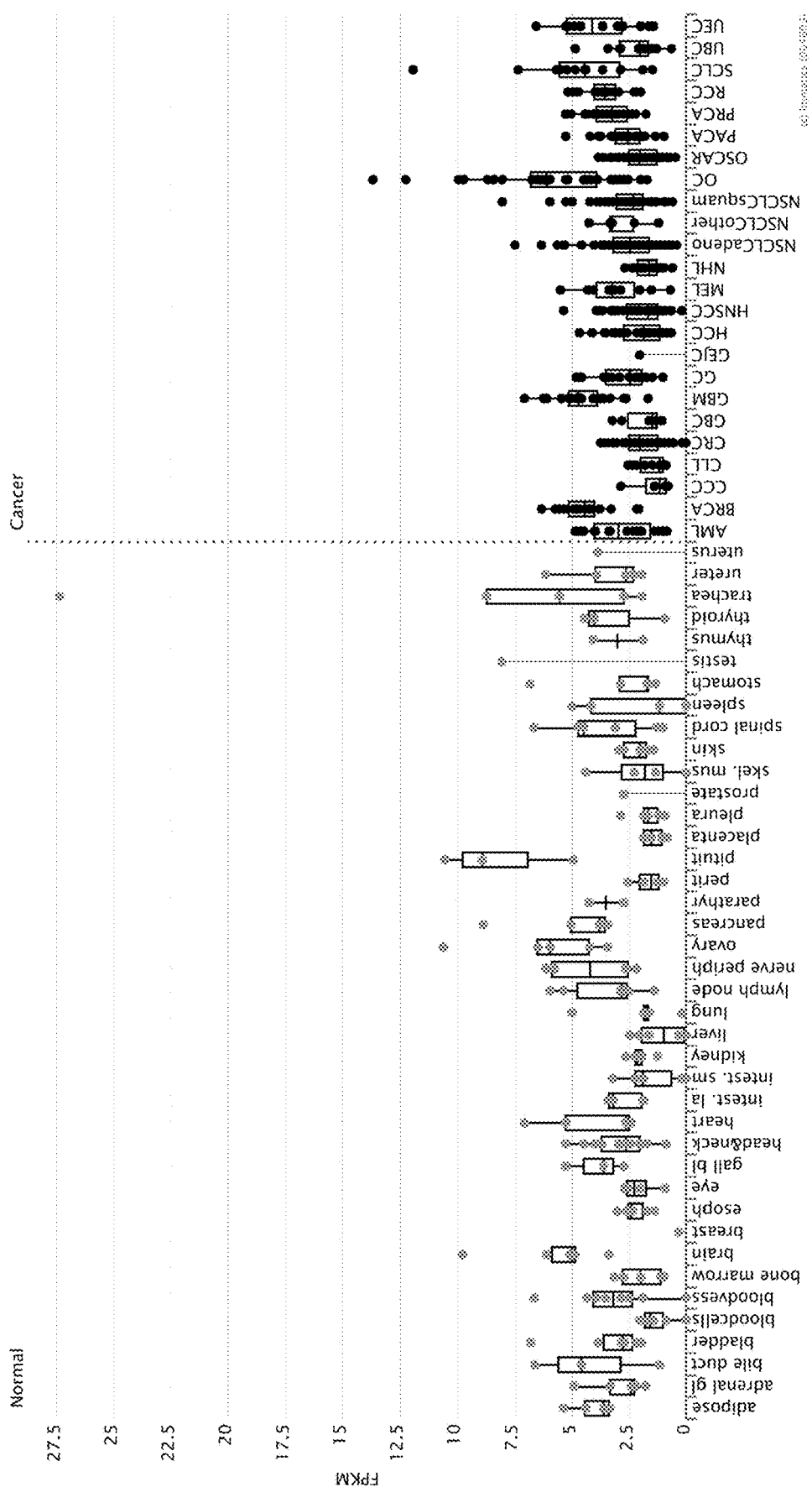
FIG. 5: Analysis of the expression profile of the peptide encoding source exon of IFT17-003 in different normal as well as tumor tissues. Tumor (black dots) and normal (grey dots) samples are grouped according to organ of origin. Box-and-whisker plots represent median FPKM value, 25th and 75th percentile (box) plus whiskers that extend to the lowest data point still within 1.5 interquartile range (IQR) of the lower quartile and the highest data point still within 1.5 IQR of the upper quartile. Normal organs are ordered alphabetically. FPKM: fragments per kilobase per million mapped reads. Tissues (from left to right): Normal samples: adipose (adipose tissue); adrenal gl (adrenal gland); bile duct; bladder; blood cells; bloodvess (blood vessels); bone marrow; brain; breast; esoph (esophagus); eye; gall bl (gallbladder); head&neck; heart; intest. la (large intestine); intest. sm (small intestine); kidney; liver; lung; lymph node; nerve periph (peripheral nerve); ovary; pancreas; parathyr (parathyroid gland); perit (peritoneum); pituit (pituitary); placenta; pleura; prostate; skel. mus (skeletal muscle); skin; spinal cord; spleen; stomach; testis; thymus; thyroid; trachea; ureter; uterus. Tumor samples: AML (acute myeloid leukemia); BRCA (breast cancer); CCC (cholangiocellular carcinoma); CLL (chronic lymphocytic leukemia); CRC (colorectal cancer); GBC (gallbladder cancer); GBM (glioblastoma); GC (gastric cancer); HCC (hepatocellular carcinoma); HNSCC (head and neck squamous cell carcinoma); MEL (melanoma); NHL (non-hodgkinHodgkin lymphoma); NSCLCadeno (non-small cell lung cancer adenocarcinoma); NSCLCother (NSCLC samples that could not unambiguously be assigned to NSCLCadeno or NSCLCsquam); NSCLCsquam (squamous cell non-small cell lung cancer); OC (ovarian cancer); OSCAR (esophageal cancer); PACA (pancreatic cancer); PRCA (prostate cancer); RCC (renal cell carcinoma); SCLC (small cell lung cancer); UBC (urinary bladder carcinoma); UEC (uterine endometrial cancer).
Figure 6:
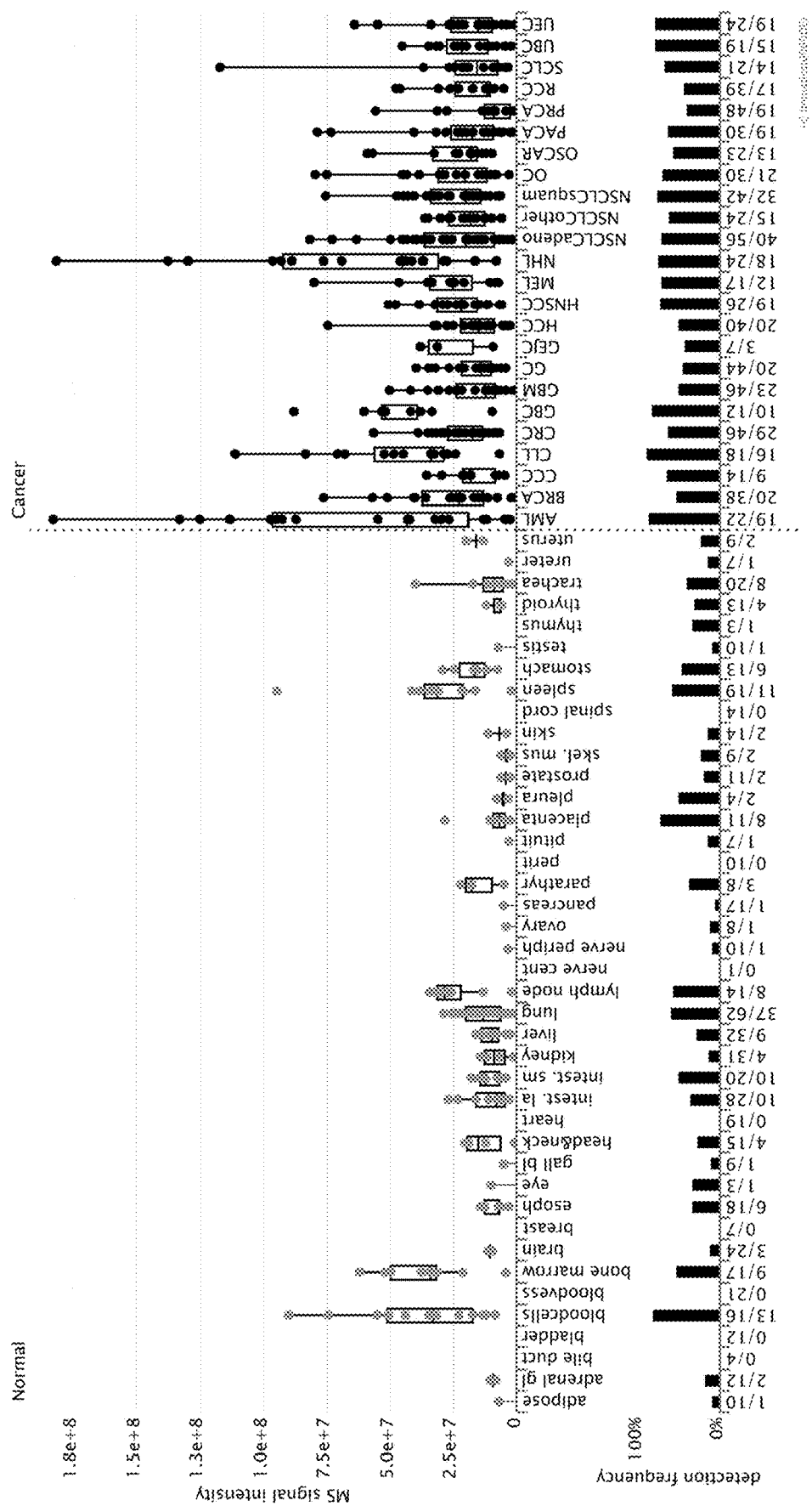
FIG. 6: Analysis of the peptide presentation of IFT17-003 on different normal as well as tumor tissues. Upper part: Median MS signal intensities from technical replicate measurements are plotted as dots for single HLA-A*02 positive normal (grey dots, left part of figure) and tumor samples (black dots, right part of figure) on which the peptide was detected. Boxes display median, 25th and 75th percentile of normalized signal intensities, while whiskers extend to the lowest data point still within 1.5 interquartile range (IQR) of the lower quartile, and the highest data point still within 1.5 IQR of the upper quartile. Normal organs are ordered alphabetically. Lower part: The relative peptide detection frequency in every organ is shown as spine plot. Numbers below the panel indicate number of samples on which the peptide was detected out of the total number of samples analyzed for each organ (N=592 for normal samples, N=710 for tumor samples). If the peptide has been detected on a sample but could not be quantified for technical reasons, the sample is included in this representation of detection frequency, but no dot is shown in the upper part of the figure. Tissues (from left to right): Normal samples: adipose (adipose tissue); adrenal gl (adrenal gland); bile duct; bladder; blood cells; bloodvess (blood vessels); bone marrow; brain; breast; esoph (esophagus); eye; gall bl (gallbladder); head&neck; heart; intest. la (large intestine); intest. sm (small intestine); kidney; liver; lung; lymph node; nerve cent (central nerve); nerve periph (peripheral nerve); ovary; pancreas; parathyr (parathyroid gland); perit (peritoneum); pituit (pituitary); placenta; pleura; prostate; skel. mus (skeletal muscle); skin; spinal cord; spleen; stomach; testis; thymus; thyroid; trachea; ureter; uterus. Tumor samples: AML (acute myeloid leukemia); BRCA (breast cancer); CCC (cholangiocellular carcinoma); CLL (chronic lymphocytic leukemia); CRC (colorectal cancer); GBC (gallbladder cancer); GBM (glioblastoma); GC (gastric cancer); GEJC (gastro-esophageal junction cancer); HCC (hepatocellular carcinoma); HNSCC (head and neck squamous cell carcinoma); MEL (melanoma); NHL (non-hodgkinHodgkin lymphoma); NSCLCadeno (non-small cell lung cancer adenocarcinoma); NSCLCother (NSCLC samples that could not unambiguously be assigned to NSCLCadeno or NSCLCsquam); NSCLCsquam (squamous cell non-small cell lung cancer); OC (ovarian cancer); OSCAR (esophageal cancer); PACA (pancreatic cancer); PRCA (prostate cancer); RCC (renal cell carcinoma); SCLC (small cell lung cancer); UBC (urinary bladder carcinoma); UEC (uterine endometrial cancer).

XPRESIDENT® peptide presentation and gene expression data can be used to evaluate the potential safety risk of off-target peptides by differentiating relevant off-targets from less relevant off-targets, which are only presented/expressed in the context of other tumor tissues. In this example, IFT17-003 is considered a highly relevant off-target due to ubiquitous expression (FIG. 5) and presentation (FIG. 6) of the peptide on different normal tissues. Combination of the presented data from this example with additional large-scale peptide presentation or expression data is therefore of additional value for the off-target risk assessment.

Figure 2:
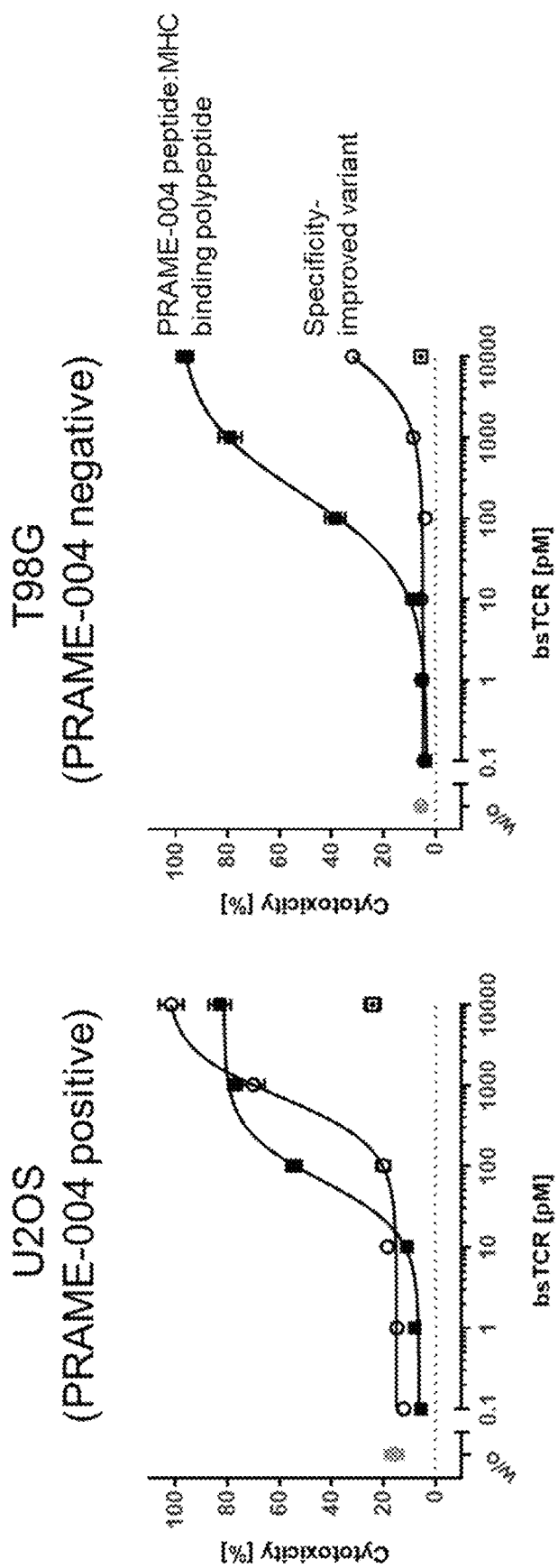
FIG. 2: Cytotoxicity experiments showing killing of a target positive (U2OS) and a target negative (T98G) cell line with two variants of the PRAME-004 peptide:MHC binding polypeptide (black rectangles: original variant, white dots: specificity improved variant following an additional round of maturation of the peptide:MHC specific binder directed against PRAME-004 using the identified off-target peptides as selection determinants). Killing of the target negative cell line T98G is strongly reduced when employing the specificity-improved variant of the peptide:MHC binding polypeptide, whereas killing of the target positive cell line U2OS is only slightly affected.
Figure 3:
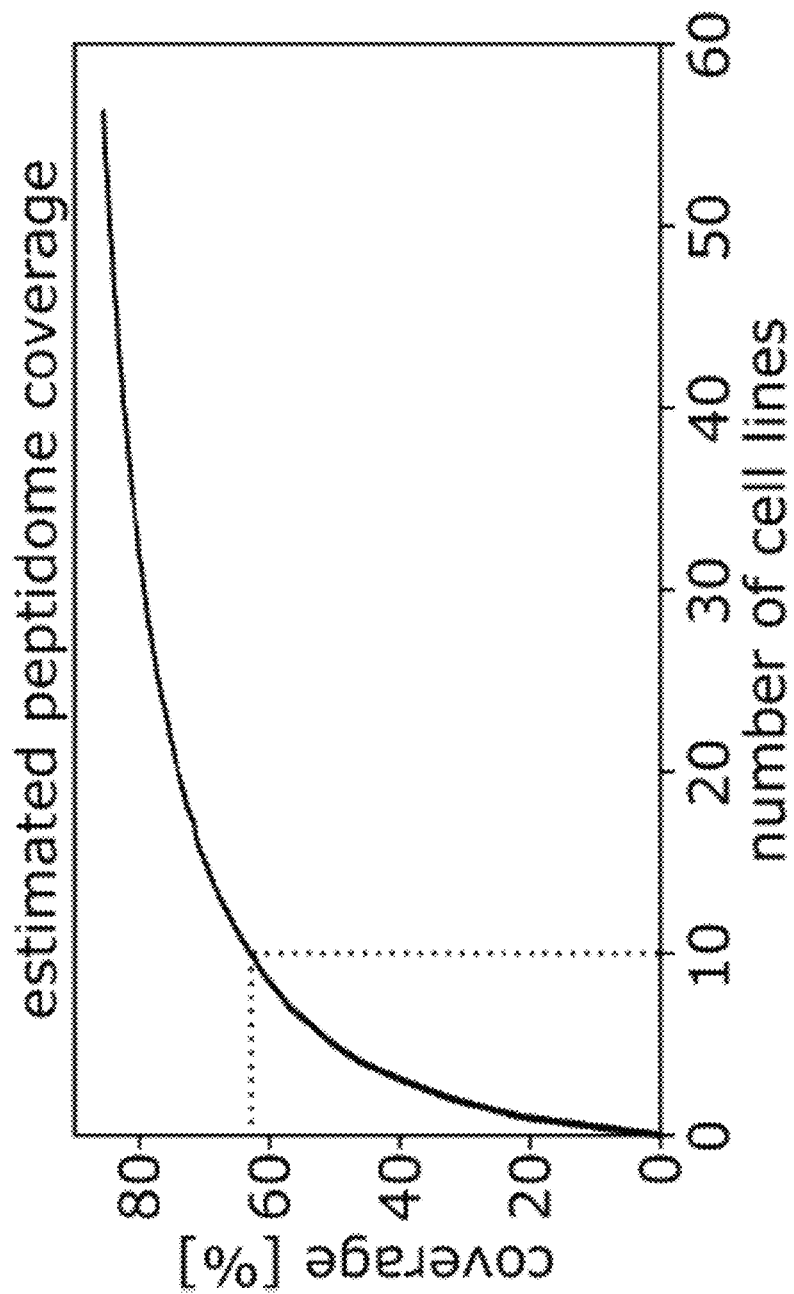
FIG. 3: The combination of several cell-lines for sample generation can be used to achieve a high coverage of the HLA-A*02 presented immunopeptidome. Based on XPRESIDENT® immunopeptidome data for 60 cell lines it is shown that a combination of already 10 of these cell lines would enable a coverage of more than 60% of the HLA-A*02 immunopeptidome, if peptides are to be considered, for which at least 10 peptide identifications on normal tissues have been previously detected.

In order to improve the specificity of the peptide:MHC binding polypeptide an additional round of maturation has been performed using the identified peptides as selection determinants. Thereby specificity of the newly generated molecules could be greatly improved shown by a reduced killing of the target negative cell line T98G in FIG. 2. Killing assays were essentially performed as described above. LDH release of target positive or target negative cells (10,000 cells/well) was quantified after co-incubation with human PBMCs (100,000 cells/well) and indicated concentrations of the peptide:MHC binding polypeptide for 48 h. The original peptide:MHC binding polypeptide molecule used for peptide isolation is shown as filled squares, whereas specificity improved variants are shown as open circles. Control peptide:MHC binding polypeptide molecule (square with asterisk) and control without bispecific molecule (circle with asterisk) do not induce target cell killing.

TABLE 2

Overview of the identified peptide:MHC binding polypeptide specific peptides. Indicated on top is the target PRAME-004. The EC50 values of cytotoxicity experiments using peptide loaded T2 cells is specified as well as the binding affinities determined by bio-layer interferometry using HIS1K biosensors.

| Peptide code | Peptide sequence | EC50 [pM] | Binding affinity fold reduction |
|---|---|---|---|
| PRAME-004 | SLLQHLIGL (SEQ ID NO: 1) | 1.2 | 1 |
| IFT17-003 | FMNPHLISV (SEQ ID NO: 2) | 1.6 | 1 |
| MCM5-006 | MLAKHVITL (SEQ ID NO: 3) | 16.1 | 3 |
| IFIT1-001 | VLLHHQIGL (SEQ ID NO: 4) | 38.4 | 8 |
| FADS2-001 | LLLAHIIAL (SEQ ID NO: 5) | 83.7 | 13 |
| CTBP1-001 | ALMYHTITL (SEQ ID NO: 6) | 79.31 | 13 |
| ITSN1-001 | ILAMHLIDV (SEQ ID NO: 7) | 1024 | 36 |
| ATP1A1-001 | FLPIHLLGL (SEQ ID NO: 8) | 196 | 106 |
| MCMB-002 | YLILHLIST (SEQ ID NO: 9) | n.a. | 127 |
| EHD4-001 | ALAKHLIKI (SEQ ID NO: 10) | n.a. | 61 |
| 5F3B3-005 | TLVYHVVGV (SEQ ID NO: 11) | n.a. | 152 |

TABLE 2-continued

Overview of the identified peptide:MHC binding polypeptide specific peptides. Indicated on top is the target PRAME-004. The EC50 values of cytotoxicity experiments using peptide loaded T2 cells is specified as well as the binding affinities determined by bio-layer interferometry using HIS1K biosensors.

| Peptide code | Peptide sequence | EC50 [pM] | Binding affinity fold reduction |
|---|---|---|---|
| EHD-001 | ALANHLIKV (SEQ ID NO: 12) | n.a. | 159 |
| FARSA-001 | LTLGHLMGV (SEQ ID NO: 13) | n.a. | 38 |
| INT57-002 | ILGTHNITV (SEQ ID NO: 14) | n.a. | 57 |
| MLXI-001 | KLTSHAITL (SEQ ID NO: 15) | n.a. | 12 |
| PPP4R1-003 | HLMPHLLTL (SEQ ID NO: 16) | n.a. | 16 |
| RIF1-004 | AIWEKLISL (SEQ ID NO: 17) | n.a. | 156 |
| SFXN3-001 | SLTKHLPPL (SEQ ID NO: 18) | n.a. | 60 |
| TBCK-002 | ALSPHNILL (SEQ ID NO: 19) | n.a. | 142 |
| TNRC6B-001 | SLARHLMTL (SEQ ID NO: 20) | n.a. | 4 |
| ZFYVE16-002 | ALCPHLKTL (SEQ ID NO: 21) | n.a. | 33 |

Identification of a Binding Motif

The identified peptides can be further used to infer a binding motif for the peptide:MHC binding polypeptide, which provides information on which of the amino acids in the peptide sequence are of relevance for the binding of said polypeptide.

Figure 7:
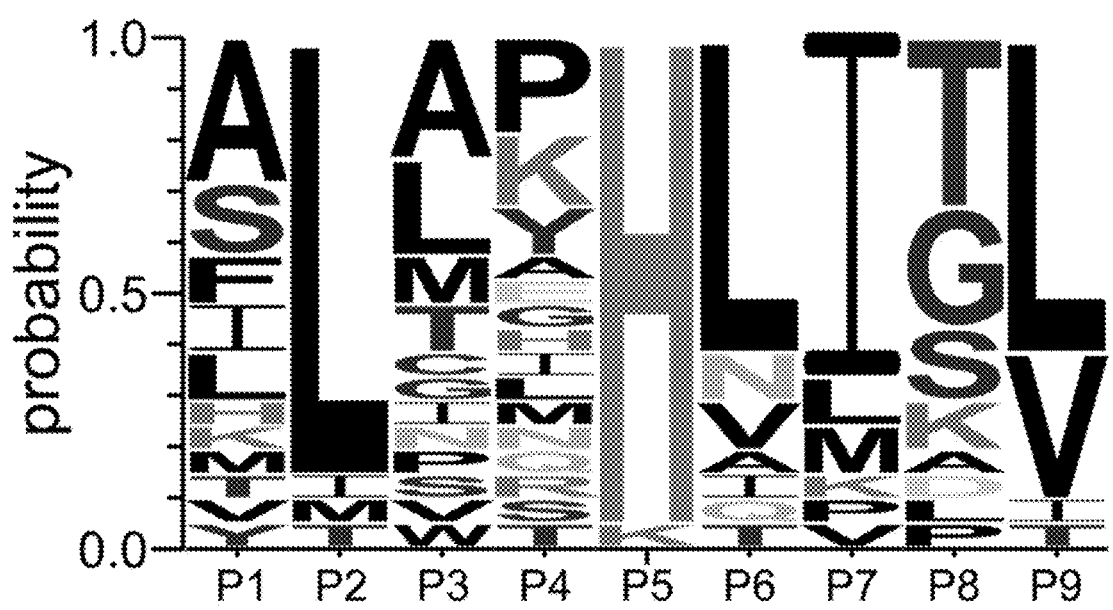
FIG. 7: Binding motif of the PRAME-004 directed peptide:MHC binding polypeptide determined using the described method. The size of individual amino acids in selected positions reflects their abundance among the identified off-targets. For example, within the identified off-targets histidine (H) in Position 5 of the peptide sequence was more frequent as compared to lysine (K).

Moreover, additional information on the binding motif can be deduced from the amino acids within the relevant positions. Based on the identified set of peptides only a subset of amino acids is tolerated in positions 1-9 of the amino acid sequence (see FIG. 7 and Table 3).

TABLE 3

Overview of the tolerated amino acids for each position identified by the presented method.

| Position | Tolerated amino acid residues |
|---|---|
| 1 | A, S, F, I, L, H, K, M, T, V, Y |
| 2 | L, I, M, T |
| 3 | A, L, M, T, C, G, I, N, P, S, V, W |
| 4 | P, K, Y, A, E, G, H, I, L, M, N, Q, R, S, T |
| 5 | H, K |
| 6 | L, N, V, A, I, Q, T |
| 7 | I, L, M, K, P, V |
| 8 | T, G, S, K, A, D, L, P |
| 9 | L, V, I, T |

In contrast to common amino acid scanning approaches, in which amino acids are replaced at individual positions by mutations and subsequently tested in in vitro assays also multiple substitutions with different potentially opposite effects on the overall binding strength can be elucidated. For example, if a substitution in position 6 of the natural amino acid sequence leads to a decrease in the overall binding affinity this might be rescued by a similar substitution in position 8 which can lead to a strong increase in the binding affinity of the peptid:MHC binding polypeptide to the peptide:MHC molecule.

The thus generated binding motif was used to search different protein sequence databases (e.g. UniProt, IPI) to find additional off-target peptides which reflect and fit to the restrictions imposed by the binding motif (i.e. defined sets of amino acids which are tolerated in relevant positions of the binding motif).

Comparative Example 1

The following experiments show how currently available methods in the art would not identify the most relevant off-target peptides identified in example 1 and are therefore not able to predict unwanted side effects of peptide:MHC binding polypeptides intended for administration in vivo.

Identification of the Binding Motif Using Positional Scanning:

Variants of the native PRAME-004 sequence, in which each amino acid is subsequently replaced with the amino acid alanine were tested for their potential to bind to the peptide:MHC binding polypeptide using bio-layer interferometry.

A L L Q H L I G L (SEQ ID NO. 38)

S A L Q H L I G L (SEQ ID NO. 39)

S L A Q H L I G L (SEQ ID NO. 40)

S L L A H L I G L (SEQ ID NO. 41)

S L L Q A L I G L (SEQ ID NO. 42)

S L L Q H A I G L (SEQ ID NO. 43)

S L L Q H L A G L (SEQ ID NO. 44)

S L L Q H L I A L (SEQ ID NO. 45)

S L L Q H L I G A (SEQ ID NO. 46)

Figure 8:
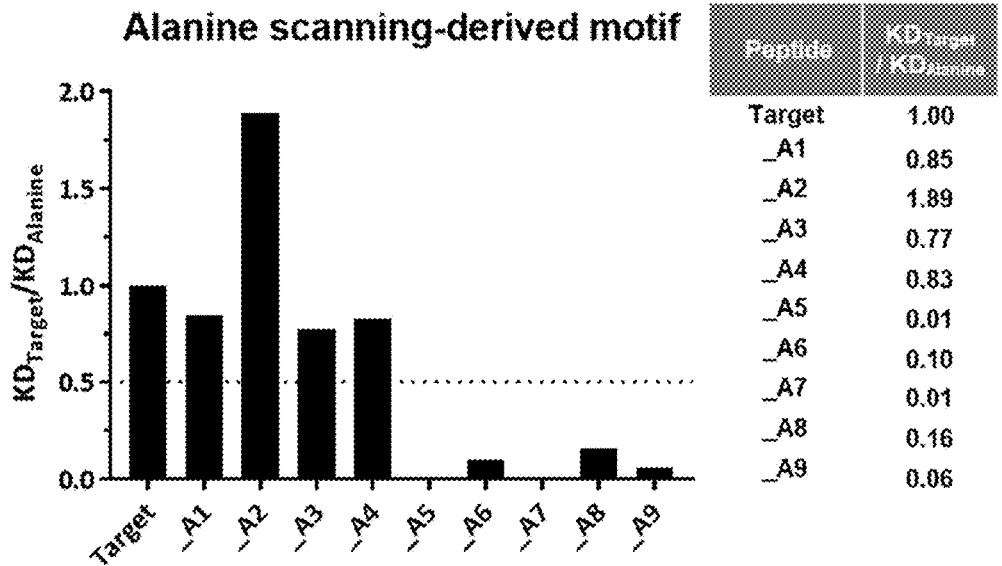
FIG. 8: Identification of the binding motif of the peptide: MHC binding polypeptide directed against PRAME-004 using positional scanning, replacing each amino acid in position 1-9 of the peptide sequence with alanine. The ratio of the KD of the target peptide PRAME-004 to the alanine substituted variant of the peptide sequence is presented for every peptide. A threshold of 50% (dashed line) of the KD ratio is applied to determine positions which are recognized by the binder. KD values were determined by bio-layer interferometry.

FIG. 8 shows the results of these experiments. Five of the alanine-substituted peptides lead to a 50% or greater decrease in binding affinity (or 2-fold or greater increase of the KD, respectively) as compared to the wild-type sequence and were therefore considered as essential for binding. Based on these results the binding motif would result in XXXXHLIGL (SEQ ID NO. 22), wherein X represents any amino acid.

In an extended variant of the positional scanning approach the PRAME-004 sequence was substituted at each position by any of the naturally occurring amino acids in a similar manner as described before. The only proteinogenic amino acid, which was not used for substitution of PRAME-004 was cysteine as this amino acid is known to rapidly undergo several chemical modifications which can lead to false interpretations regarding recognition of peptides during testing. So, in total 9*18=162 peptides were investigated.

Figure 9:
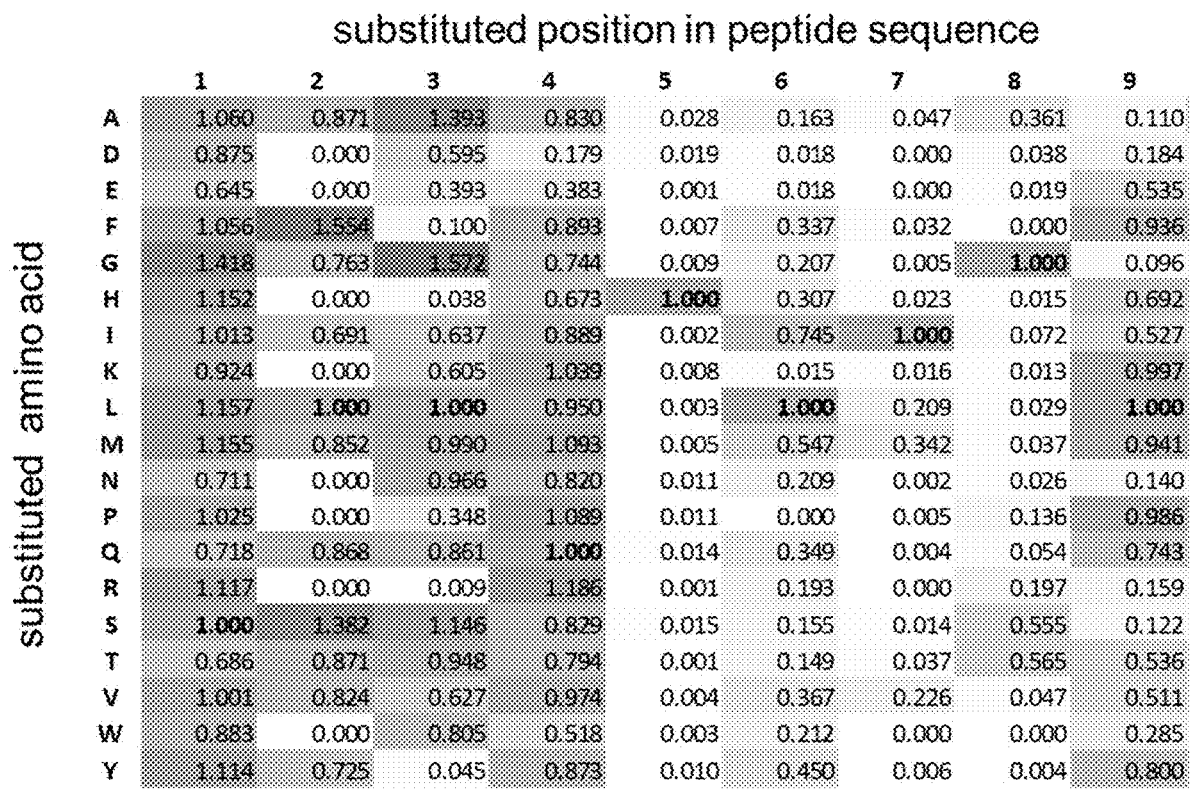
FIG. 9: Complex binding motif determination using amino acid substitutions with all proteinogenic amino acids per position (except cysteine). Ratios of the KD of the target peptide PRAME-004 to the respective positional scanning variant are represented and greyscale-coded (showing low to high values colored from white to dark grey). KD values were determined by bio-layer interferometry.

Each peptide was again tested for its binding affinity using bio-layer interferometry (FIG. 9). Peptides which lead to a 50% or greater decrease in binding affinity (or 2-fold or greater increase of the KD, respectively) as compared to the wild-type sequence were considered as not tolerated or detrimental for peptide binding. This resulted in a complex binding motif with a set of different amino acids being tolerated or accepted in position 1-9 of the amino acid sequence:

$$X_1X_2X_3X_4HX_5IX_6X_7$$

wherein $X_1$ is selected from any of ADEFGHIKLMNPQRSTVWY; $X_2$ is selected from any of AFGILMQSTVY; $X_3$ is selected from any of ADGIKLMNQSTVW; $X_4$ is selected from any of AFGHIKLMNPQRSTVWY; $X_5$ is selected from any of ILM; $X_6$ is selected from any of GST; and $X_7$ is selected from any of EFHIKLMPQTVY.

Similarity Search Based on Ala-Scan Derived Binding Motif:

An in-house software tool was used to search different protein sequence databases (IPI v. 3.78, Ensembl Version 77 GrCH38 including SNVs, NCBI non-redundant protein database) for human proteins which contain the identified motif sequence (X-X-X-X-H-L-I-G-L) (SEQ ID NO. 22), in which X could be constituted by any amino acid. Eight unique peptides were identified: the target itself, PRAME-004 and seven peptides originating from different human proteins: VEZT (Vezatin), HTR2C (5-hydroxytryptamine receptor 2C), HEPHL1 (Hephaestin-like protein 1), COL28A1 (Collagen alpha-1(XXVIII) chain), SLC2A1 (Solute carrier family 2, facilitated glucose transporter member 1), SLC44A3 (Choline transporter-like protein 3), PIEZO2 (Piezo-type mechanosensitive ion channel component 2).

The amino acid sequences of these peptides are shown below.

| Protein (Uniprot accession number) | Sequence | | | | | | | | |
|---|---|---|---|---|---|---|---|---|---|
| PRAME (P78395) (SEQ ID NO. 1) | S | L | L | Q | H | L | I | G | L |
| VEZT (Q9HBM0) (SEQ ID NO. 23) | H | P | S | Q | H | L | I | G | L |
| HTR2C (P28335) (SEQ ID NO. 32) | S | F | L | V | H | L | I | G | L |
| HEPHL1 (Q6MZM0) (SEQ ID NO. 33) | R | V | S | W | H | L | I | G | L |
| COL28A1 (Q2UY09) (SEQ ID NO. 34) | I | N | E | S | H | L | I | G | L |
| SLC2A1 (P11166) (SEQ ID NO. 35) | R | R | T | L | H | L | I | G | L |
| SLC44A3 (Q8N4M1) (SEQ ID NO. 36) | M | W | S | Y | H | L | I | G | L |
| PIEZO2 (Q9H5I5) (SEQ ID NO. 37) | F | T | A | G | H | L | I | G | L |

In-house XPRESIDENT® immunopeptidome data from 592 normal tissue samples and 710 tumor tissue samples, all derived from HLA-A*02 typed individuals, showed that none of the 7 predicted off-target peptides, has ever been identified to be presented in the context of HLA-A*02 on any of the analyzed samples. Notably, the VEZT and SLC2A1 derived peptide have been previously identified by XPRESIDENT® on tissue samples of non-A*02 positive individuals suggesting that they are presented by different HLA allotypes (HLA-B*07 in case of the VEZT derived peptide and HLA-B*27 in case of the SLC2A1 derived peptide) and are therefore not likely to produce an off-target risk in the context of an HLA-A*02 restricted peptide:MHC binding polypeptide. The positional scanning and prediction approach failed however to identify any of the relevant off-target peptides which could be identified with the superior method described in this application.

Similarity Search Based on the Complex Binding Motif:

The same in-house software tool was also used to predict peptides derived from the human proteome which fulfill the criteria of the complex binding motif. As cysteine was excluded during substitution, this amino acid was hence additionally allowed for every position in the amino acid sequence resulting in the following motif:

$$X_8X_9X_{10}X_{11}X_{12}X_{13}X_{14}X_{15}X_{16}$$

wherein $X_8$ is selected from any of ACDEFGHIKLMNPQRSTVWY; $X_9$ is selected from any of ACFGILMQSTVY; $X_{10}$ is selected from any of ACDGIKLMNQSTVW; $X_{11}$ is selected from any of ACFGHIKLMNPQRSTVWY; $X_{12}$ is selected from any of CH; $X_{13}$ is selected from any of CILM; $X_{14}$ is selected from any of CI; $X_{15}$ is selected from any of CGST; and $X_{16}$ is selected from any of CEFHIKLMPQTVY.

The search resulted in a total list of 888 different peptides fulfilling the binding motif criteria. Only two peptides (IFT17-003 and ATP1A1-001) were overlapping with the list of relevant off-targets identified by the superior method described in this application in example 1, whereas the rest would not have been identified in the prediction-based approach, even if all 888 peptides would have been tested afterwards in downstream in vitro analyses.

Example 2

The targeted MHC peptide used in this example which is presented in the context of HLA-A*02 is derived from the melanoma associated antigens A4 and A8 (MAGEA4/A8) and shows the sequence KVLEHVVRV (SEQ ID NO. 24), herein also referred to as MAGEA4/8.

The peptide:MHC binding polypeptide is constituted by a modified T-cell receptor molecule which has been engineered to be soluble and shows an enhanced affinity to the MAGEA4/A8 derived peptide and additionally comprised a CD3 binding antibody moiety. As a biological source of peptide:MHC mixtures the human HLA-A*02 high expressing and MAGA4/8 positive lung adenocarcinoma derived cell line NCI-H1755 has been employed. Five hundred million cells of this cell line were subjected to lysis in a CHAPS detergent-containing buffer and homogenized assisted by sonification.

Coupling of the peptide:MHC binding polypeptide and affinity chromatography were carried out as described in Example 1. Before applying the NCI-H1755 lysate containing the mixture of peptide:MHC molecules to the glycine coupled and peptide:MHC binder coupled SEPHAROSE the volume was split half and half. The second half of the volume was run in parallel over a different glycine coupled SEPHAROSE matrix followed by a SEPHAROSE matrix coupled with the HLA-A*02 specific antibody BB7.2. The latter is aimed to isolate the complete spectrum of peptides presented by HLA-A*02 in this cell line (see also FIG. 1).

Peptides were eluted from all columns and subjected to mass spectrometry analysis as outlined in Example 1. Peptides eluted from glycine columns as well as known contaminants were again excluded from further analysis. In addition, all peptide precursor signals were quantified over all different runs using SuperHirn algorithm (Mueller et al., 2007). Features were extracted and quantified over all mass spectrometry experiments using a fixed retention time window of ±3 min, and a mass accuracy of ±5 ppm.

Ratios of the resulting area of individual peptide precursor signals from the MAGA4/8 specific peptide:MHC binding polypeptide to the same precursor signals from the BB7.2 preparation were calculated. These ratios reflect the isolation efficiency of the MAGA4/8 peptide:MHC binding polypeptide in comparison to the HLA-A*02 specific antibody BB7.2. Due to the high affinity of the MAGA4/8 specific peptide:MHC binding polypeptide for their target as well as for potential off-targets peptides bound to the HLA-A*02 molecule, the isolation efficiencies for these peptides are much higher as compared to BB7.2 which has an affinity in the lower nanomolar range towards HLA-A*02 largely independent of the bound peptide species (Parham and Brodsky, 1981). Analysis of the mass spectrometry data identified 10 peptides including the target peptide MAGA4/8 (see Table 4). Ranking of these peptides according to the ratio of areas of the peptide:MHC binding polypeptide and BB7.2 enables a determination of the isolation efficiency of these peptides in comparison to BB7.2 which correlates with the binding affinity employing bio-layer interferometry as described in Example 1. Thereby the risk for off-target toxicities and potential therapeutic windows between target and off-target peptides can be directly deduced from the quantitative data of the mass spectrometry experiments.

In the presented example in Table 4 the ratio of areas for MAGEA1 is smaller as compared to the target peptide MAGA4/8 (~11 as compared to ~10.6), which translates into a very small reduction of binding affinity of 4.1. In contrast, for the peptide HEAT5RA the large decrease in the ratio of areas, around 800-fold lower as compared to MAGA4/8, is also reflected in a largely reduced binding affinity of 238 as compared to MAGA4/8.

Figure 10:
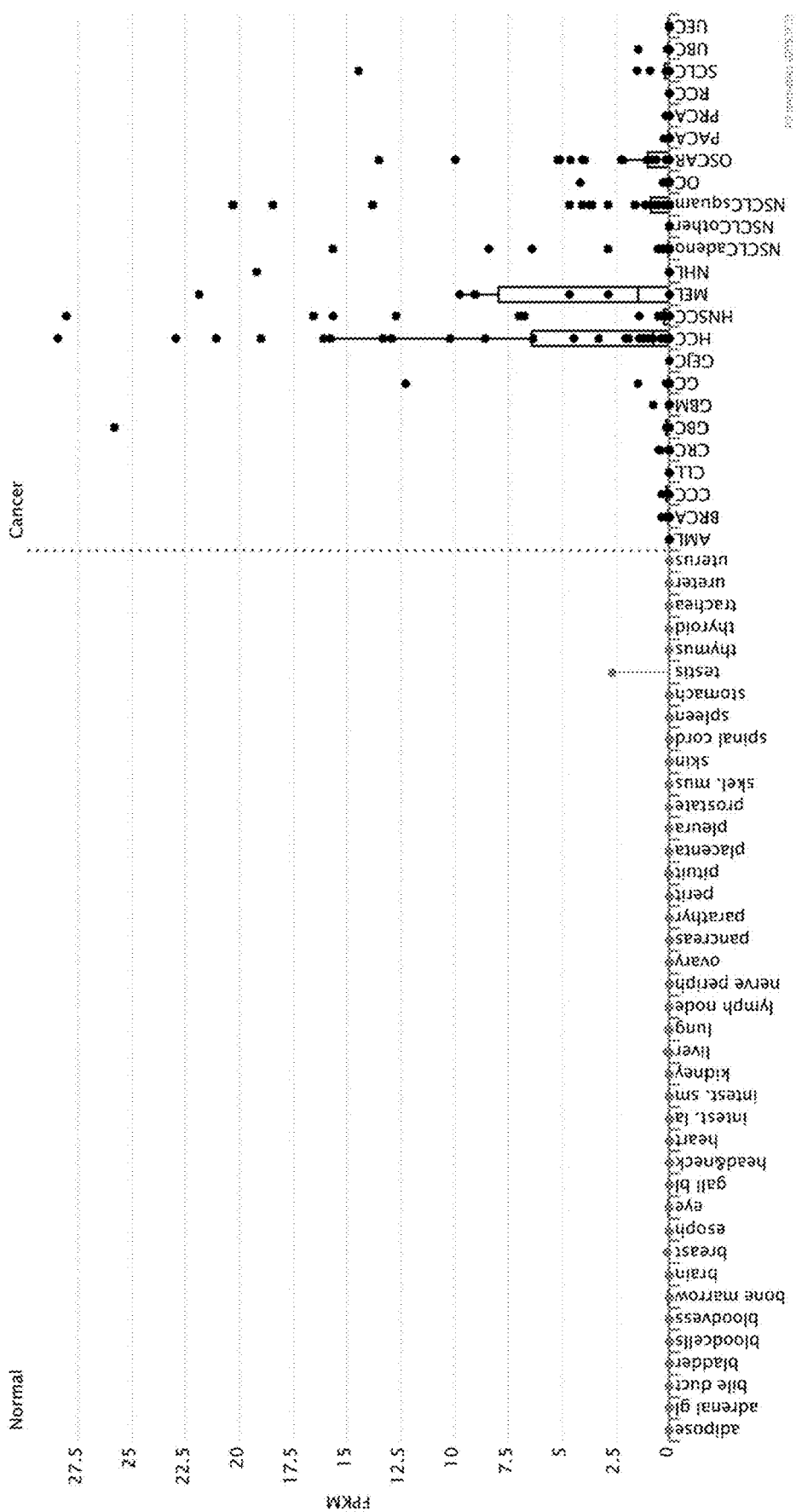
FIG. 10: Analysis of the expression profile of the peptide encoding source exon of MAGEA1 in different normal as well as tumor tissues. For a detailed figure description please refer to the legend of FIG. 5.
Figure 11:
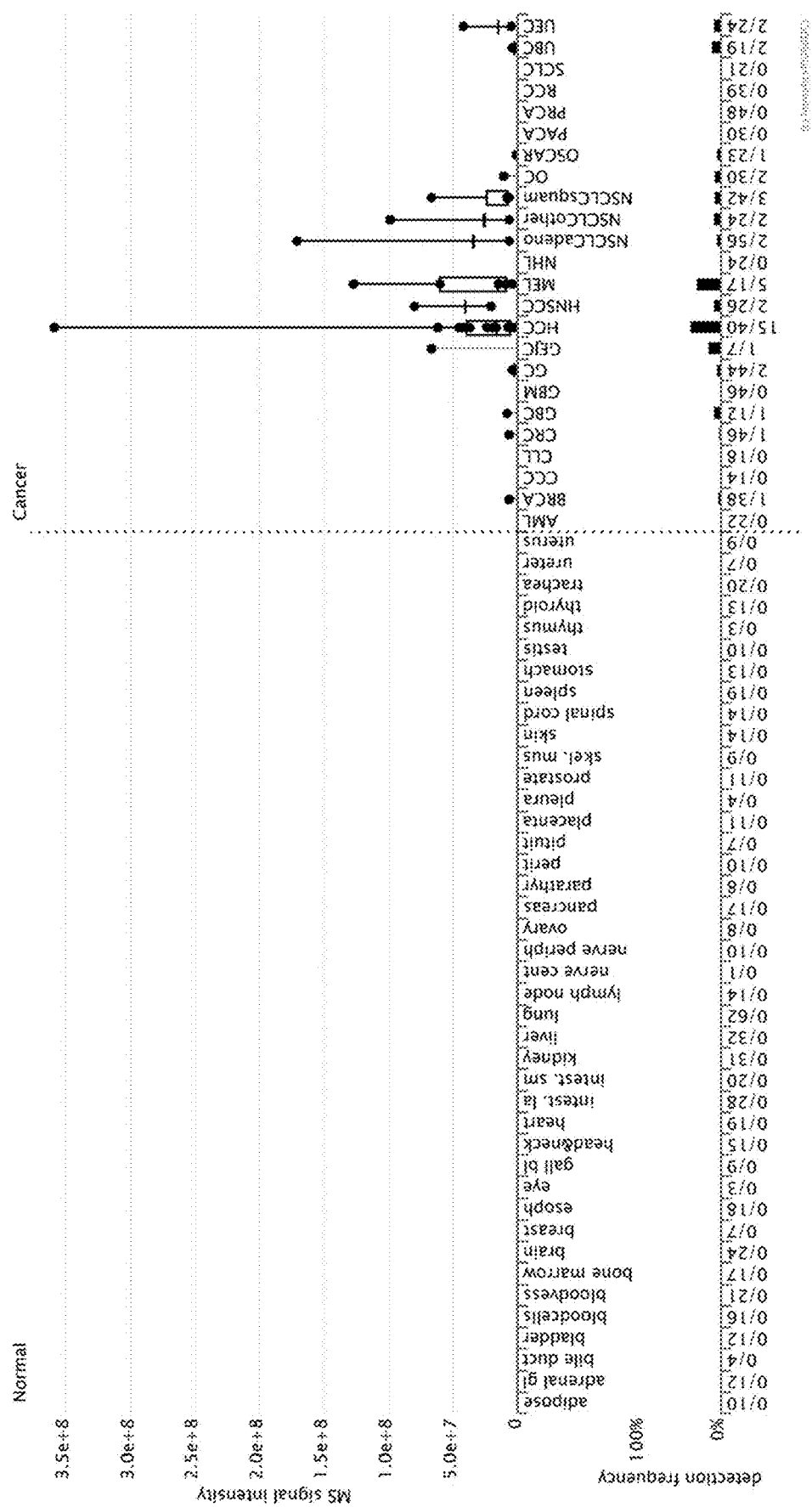
FIG. 11: Analysis of the peptide presentation of MAGEA1 on different normal as well as tumor tissues. For a detailed figure description please refer to the legend of FIG. 6.

Deeper analysis of peptide presentation and gene expression data in XPRESIDENT® show that MAGEA1 does not present a relevant off-target risk, as it is exclusively presented on cancer tissues (FIG. 10) and shows a cancer-testis like expression pattern (FIG. 11).

TABLE 4

Overview of the identified peptide:MHC binding polypeptide specific peptides. Indicated is the ratio of peptides eluted from the MAGA4/8 binding polypeptide to the HLA-A*02 specific binding peptide BB7.2 by mass spectrometry. In the top row the target peptide MAGA4/A8 is presented showing the highest ratio of signal areas. The PMBEC score is a measure for peptide similarity to the target sequence. The binding affinities were determined by bio-layer interferometry using HIS1K biosensors.

| Peptide code | Peptide sequence | Ratio of signal areas [MAGA4/8 binder/BB7.2] | PMBEC | Binding affinity fold reduction |
|---|---|---|---|---|
| MAGEA4/A8 | KVLEHVVRV (SEQ ID NO. 24) | 11 | 1.85568 | 1 |
| MAGEA1 | KVLEYVIKV (SEQ ID NO. 25) | 10.615 | 1.42928 | 4.1 |
|  | KVLEFLAKV (SEQ ID NO. 26) | 5.218 | 1.24828 |  |
|  | KIIDLLPKV (SEQ ID NO. 27) | 4.009 | 0.94598 |  |
|  | KLQEFLQTL (SEQ ID NO. 28) | 0.032 | 0.45866 |  |
| HEAT5RA | KVLETLVTV (SEQ ID NO. 29) | 0.014 | 1.06691 | 237.7 |
| FAM115A | KLGSVPVTV (SEQ ID NO. 30) | 0.006 | 0.50865 | 503.1 |
|  | KIADFGWSV (SEQ ID NO. 31) | 0.002 | 0.53985 |  |

Abbreviations
APC Antigen presenting cells
BIRD Blackbody infrared radiative dissociation
BiTE Bispecific T-cell engager
CAR Chimeric antigen receptors
CDR Complementarity determining regions
CID Collision-induced dissociation
DART Dual-affinity re-targeting antibody
DDA Data-dependent acquisition
DIA Data-independent acquisition
DRIP Defective ribosomal particles
ECD Electron-capture dissociation
EDD Electron-detachment dissociation
ETCID Electron-transfer and collision-induced dissociation
ETD Electron-transfer dissociation
ETHCD Electron-Transfer/Higher-Energy Collision Dissociation
HCD Higher-energy collisional dissociation
IRMPD Infrared multiphoton dissociation
IQR Interquartile range
KD Dissociation constant
NETD Negative electron-transfer dissociation
LDH Lactate dehydrogenase
PBMC Peripheral blood mononuclear cell
SID Surface-induced dissociation
SMITE Simultaneous multiple interaction T-cell engaging
TandAb Tandem antibody
TCR T-cell receptor
TFA Trifluoroacetic acid
TIL Tumor-infiltrating lymphocytes

REFERENCES

Barnstable C J, Bodmer W F, Brown G, Galfre G, Milstein C, Williams A F, Ziegler A (1978). Production of monoclonal antibodies to group A erythrocytes, HLA and other human cell surface antigens-new tools for genetic analysis. Cell 14, 9-20.

Berger A E, Davis J E, Cresswell P (1982). Monoclonal antibody to HLA-A3. Hybridoma 1, 87-90.

Bijen H M, van der Steen D M, Hagedoorn R S, Wouters A K, Wooldridge L, Falkenburg JHF, Heemskerk MHM (2018). Preclinical Strategies to Identify Off-Target Toxicity of High-Affinity TCRs. Mol Ther 26, 1206-1214.

Birnbaum M E, Mendoza J L, Sethi D K, Dong S, Glanville J, Dobbins J, Ozkan E, Davis M M, Wucherpfennig K W, Garcia K C (2014). Deconstructing the peptide-MHC specificity of T cell recognition. Cell 157, 1073-1087.

Ekeruche-Makinde J, Miles J J, van den Berg H A, Skowera A, Cole D K, Dolton G, Schauenburg A J, Tan M P, Pentier J M, Llewellyn-Lacey S, et al. (2013). Peptide length determines the outcome of TCR/peptide-MHCI engagement. Blood 121, 1112-1123.

Jahn L, van der Steen D M, Hagedoorn R S, Hombrink P, Kester M G, Schoonakker M P, de Ridder D, van Veelen P A, Falkenburg J H, Heemskerk M H (2016). Generation of CD20-specific TCRs for TCR gene therapy of CD20low B-cell malignancies insusceptible to CD20-targeting antibodies. Oncotarget 7, 77021-77037.

Kolstad A, Hansen T, Hannestad K (1987). A human-human hybridoma antibody (TrB12) defining subgroups of HLA-DQw1 and -DQw3. Hum Immunol 20, 219-231.

Lampson L A, Levy R (1980). Two populations of Ia-like molecules on a human B cell line. J Immunol 125, 293-299.

Linette G P, Stadtmauer E A, Maus M V, Rapoport A P, Levine B L, Emery L, Litzky L, Bagg A, Carreno B M, Cimino P J, et al. (2013). Cardiovascular toxicity and titin cross-reactivity of affinity-enhanced T cells in myeloma and melanoma. Blood 122, 863-871

Maeda H, Hirata R (1984). Separation of four class II molecules from DR2 and DRw6 homozygous B lymphoid cell lines. Immunogenetics 20, 639-647.

Morgan R A, Chinnasamy N, Abate-Daga D, Gros A, Robbins P F, Zheng Z, Dudley M E, Feldman S A, Yang J C, Sherry R M, et al. (2013). Cancer regression and neurological toxicity following anti-MAGE-A3 TCR gene therapy. J Immunother 36, 133-151.

Mueller L N, Rinner O, Schmidt A, Letarte S, Bodenmiller B, Brusniak M Y, Vitek O, Aebersold R, Muller M (2007). SuperHirn—a novel tool for high resolution L C-M S-based peptide/protein profiling. Proteomics 7, 3470-3480.

Parham P, Brodsky F M (1981). Partial purification and some properties of BB7.2. A cytotoxic monoclonal antibody with specificity for HLA-A2 and a variant of HLA-A28. Hum Immunol 3, 277-299.

Raman M C, Rizkallah P J, Simmons R, Donnellan Z, Dukes J, Bossi G, Le Provost G S, Todorov P, Baston E, Hickman E, et al. (2016). Direct molecular mimicry enables off-target cardiovascular toxicity by an enhanced affinity TCR designed for cancer immunotherapy. Sci Rep 6, 18851.

Rebai N, Mercier P, Kristensen T, Devaux C, Malissen B, Mawas C, Pierres M (1983). Murine H-2Dd-reactive monoclonal antibodies recognize shared antigenic determinant(s) on human HLA-B7 or HLA-B27 molecules or both. Immunogenetics 17, 357-370.

Smith S N, Wang Y, Baylon J L, Singh N K, Baker B M, Tajkhorshid E, Kranz D M (2014). Changing the peptide specificity of a human T-cell receptor by directed evolution. Nat Commun 5, 5223.

Spits H, Keizer G, Borst J, Terhorst C, Hekman A, de Vries J E (1983). Characterization of monoclonal antibodies against cell surface molecules associated with cytotoxic activity of natural and activated killer cells and cloned CTL lines. Hybridoma 2, 423-437.

Stewart-Jones G, Wadle A, Hombach A, Shenderov E, Held G, Fischer E, Kleber S, Nuber N, Stenner-Liewen F, Bauer S, et al. (2009). Rational development of high-affinity T-cell receptor-like antibodies. Proc Natl Acad Sci USA 106, 5784-5788.

Stone J D, Kranz D M (2013). Role of T cell receptor affinity in the efficacy and specificity of adoptive T cell therapies. Front Immunol 4, 244.

What is claimed is:

1. A method for identifying the binding of a polypeptide molecule that comprises at least one defined peptide binding domain (pMHC binding polypeptide) capable of binding to a target peptide in complex with a major histocompatibility complex (MHC) molecule (peptide: MHC complex), wherein said pMHC binding polypeptide comprises a T-cell receptor (TCR) and/or an antibody or a pMHC binding fragment thereof, and wherein said method comprises the following steps:

a) providing a sample comprising a first off-target peptide: MHC complex and a second off-target peptide: MHC complex, wherein said sample is a cellular lysate, b) contacting a first fraction of said sample comprising the first off-target peptide: MHC complex with said pMHC binding polypeptide, and allowing said at least one peptide binding domain of said pMHC binding polypeptide to bind to said first off-target peptide: MHC complex, c) isolating a first off-target peptide from said first off-target peptide: MHC complex bound to said at least one peptide binding domain, and d) identifying said first off-target peptide of said first off-target peptide: MHC complex as isolated in step c), and e) contacting a second fraction of said sample comprising said second off-target peptide: MHC complex with an MHC pan-specific antibody or an antigen binding fragment thereof, which is capable of binding to an MHC molecule irrespective of the nature of the bound peptide, f) isolating said second off-target peptide from said second off-target peptide: MHC complex bound to said MHC pan-specific antibody or antigen binding fragment thereof, and g) identifying said second off-target peptide of said second off-target peptide: MHC complex as isolated in step f), wherein said identifying in steps d) and g) comprises peptide sequencing, wherein said first off-target peptide and said second off-target peptide comprise an identical amino acid sequence.

2. The method according to claim 1,
wherein said pMHC binding polypeptide:
(i) is attached to a matrix material; or further comprises at least one attachment site binding to, or being attached to, a matrix material;
and/or
(ii) is selected from a bispecific molecule, a trispecific molecule, a tetraspecific molecule, and a multispecific molecule.

3. The method according to claim 1,
wherein said pMHC binding polypeptide:
(i) is a molecule or is derived from a molecule selected from an antibody, a simultaneous multiple interaction T-cell engaging (SMITE) bispecific, a bispecific T-cell engager (BiTE), an scFv, a diabody, a dual-affinity retargeting antibody (DART), a tandem antibody (TandAb), a soluble TCR, a single chain TCR (scTCR), a mutated TCR comprising S-bridges, a truncated TCR, and a bispecific T-cell receptor (TCR)-antibody fusion molecule; and/or
(ii) comprises at least one second binding domain, wherein said second binding domain is capable of binding to a cell surface molecule selected from CD3, CD4, CD7, CD8, CD10, CD11b, CD11c, CD14, CD16, CD18, CD22, CD25, CD28, CD32a, CD32b, CD33, CD41, CD41b, CD42a, CD42b, CD44, CD45RA, CD49, CD55, CD56, CD61, CD64, CD68, CD94, CD90, CD117, CD123, CD125, CD134, CD137, CD152, CD163, CD193, CD203c, CD235a, CD278, CD279, CD287, Nkp46, NKG2D, GITR, FcεRI, TCRα/β, TCRγ/δ, and HLA-DR; and/or
(iii) is a bispecific molecule comprising a binding domain that is derived from a T cell-receptor (TCR).

4. The method according to claim 2, wherein the attachment site is:
a separate attachment group and that does not interfere with the binding of said pMHC binding polypeptide.

5. The method according to claim 1, wherein said cellular lysate is provided by generating a lysate from:
(i) peptide: MHC expressing cells; and/or
(ii) one or more tissues or cell lines, said tissue being selected from one or more primary healthy tissue samples, one or more tumor tissues from cancer patients, and infected tissue.

6. The method according to claim 1, wherein said identifying of step d) further comprises (i) identifying a consensus peptide binding motif shared by said first and second off-target peptides and said target peptide for said peptide binding domain of said pMHC binding polypeptide, and/or
(ii) identifying a position-based consensus peptide binding motif shared by said first and second off-target peptides and said target peptide for said peptide binding domain of said pMHC binding polypeptide, and/or
(iii) identifying a potential cross-reactivity of said peptide binding domain of said pMHC binding polypeptide.

7. The method according to claim 1, wherein said peptide sequencing comprises analysis by mass spectrometry (MS), and wherein said analysis by MS comprises a quantitative assessment of peptide signal areas of MS or MS/MS.

8. The method according to claim 6, further comprising
(i) the step of identifying the presentation of said peptide motif or peptide motifs on cancerous and/or non-cancerous cells or tissues, and/or
(ii) adding to said sample in step a) at least
one control peptide having a known sequence and/or
one defined and/or preselected peptide: MHC complex, the peptide of which has a known sequence,
in a predetermined amount (spiking),
wherein optionally:
(a) the sequence of said one control peptide and/or the peptide of said one defined and/or preselected peptide: MHC complex is altered or mutated relative to the sequence of the target peptide in the peptide: MHC complex to which said pMHC binding polypeptide is capable of binding; and
(b) a series of mutants of the target peptide in the peptide: MHC complex to which said pMHC binding polypeptide is capable of binding is created and added to said sample in step a), each mutant having, over its entire length or over at least a subfraction thereof, the amino acid residue at one position substituted for an alternative amino acid, and
(c) each mutant has, over its entire length or over at least a subfraction thereof, the amino acid residue at one position substituted with alanine or glycine, and
(d) the anchoring positions of the target peptide in the peptide: MHC complex to which said pMHC binding polypeptide binds are not altered/mutated, and/or further comprising
(iii) a computational analysis of off-target binding of the said at least one defined peptide binding domain.

9. The method according to claim 1, wherein the at least one peptide binding domain comprises a detectable marker or label.

10. The method according to claim 6, comprising a step of further assessing the said potential cross-reactivity of said peptide binding domain of said pMHC binding polypeptide using at least one cytotoxicity assay.

11. The method according to claim 1, wherein:
(i) said sample does not contain the target peptide: MHC complex; or
(ii) wherein in step (b) said pMHC binding polypeptide is coupled or attached to a matrix material.

12. The method of claim 1, wherein said pMHC binding polypeptide comprises T-cell receptor (TCR).

13. The method of claim 1, wherein said pMHC binding polypeptide comprises a an antibody or a pMHC binding fragment thereof.

14. The method of claim 1, wherein said pMHC binding polypeptide is a bispecific molecule comprising:
(i) a first peptide binding domain (pMHC binding polypeptide) that is capable of binding to a target peptide in a complex with a major histocompatibility complex (MHC) molecule (peptide: MHC complex), wherein said first peptide binding domain is derived from a T-cell receptor (TCR); and
(ii) a second binding domain that is capable of binding to CD3.

15. The method of claim 1, further comprising:
h) calculating a ratio of the amounts of (i) said first off-target peptide isolated in step c) and identified in step d) and (ii) said second off-target peptide isolated in step f) and identified in step g).

16. The method of claim 15,
wherein said peptide sequencing comprises analysis by mass spectrometry (MS),
wherein said analysis by MS comprises quantitative assessment of MS signal, and
wherein in step h), said ratio is calculated from the quantified MS signal of said first off-target peptide and the quantified MS signal of said second off-target peptide.

17. The method of claim 16, wherein said MS signal comprises a MS signal area.

18. The method of claim 16, wherein said MS comprises MS/MS.

19. The method of claim 15, wherein said ratio is a comparison of the isolation efficiency of the pMHC binding polypeptide relative to the isolation efficiency of the MHC pan-specific antibody or antigen binding fragment thereof with respect to said first and second off-target peptides.

20. The method of claim 15, wherein said ratio correlates with the binding affinity of said first off-target peptide:MHC complex or said second off-target peptide:MHC complex to said pMHC binding polypeptide.

21. The method of claim 20, wherein the binding affinity is determined by bio-layer interferometry.

22. The method according to claim 1, wherein said peptide sequencing comprises analysis by mass spectrometry (MS), and wherein said analysis by MS comprises a quantitative assessment of peptide signal intensities of MS or MS/MS.

* * * * *